INVENTORS
GEORGE G. GORBATENKO SYED RAZI
JAMES JURSIK NORMAN D. WILSON
MILTON J. KIMMEL
BY Richard H. Smith
ATTORNEY Aug. 5, 1969 G. G. GORBATENKO ET AL 3,460,131

SEQUENTIALLY GATED SUCCESSIVE APPROXIMATION ANALOG TO DIGITAL CONVERTER

Filed July 23, 1965 8 Sheets-Sheet 3

| | INPUTS | | | | | | | OUTPUTS | | | | |
|---|---|---|---|---|---|---|---|---|---|---|---|---|
| | $\bar{4}$ | $\bar{2}$ | $\bar{1}$ | M | P | C | B | C | B | $\bar{4}$ | $\bar{2}$ | $\bar{1}$ |
| A | 0 | 0 | 0 | 0 | 0 | 0 | 0 | 0 | 0 | 0 | 0 | 0 |
| | 0 | 0 | 1 | 0 | 0 | 0 | 0 | 0 | 0 | 0 | 0 | 1 |
| | 0 | 1 | 0 | 0 | 0 | 0 | 0 | 0 | 0 | 0 | 1 | 0 |
| | 0 | 1 | 1 | 0 | 0 | 0 | 0 | 0 | 0 | 0 | 1 | 1 |
| | 1 | 0 | 0 | 0 | 0 | 0 | 0 | 0 | 0 | 1 | 0 | 0 |
| | 1 | 0 | 1 | 0 | 0 | 0 | 0 | 0 | 0 | 1 | 0 | 1 |
| | 1 | 1 | 0 | 0 | 0 | 0 | 0 | 0 | 0 | 1 | 1 | 0 |
| | 1 | 1 | 1 | 0 | 0 | 0 | 0 | 0 | 0 | 1 | 1 | 1 |
| B | 0 | 0 | 0 | 0 | 0 | 1 | 0 | 0 | 0 | 0 | 0 | 1 |
| | 0 | 0 | 1 | 0 | 0 | 1 | 0 | 0 | 0 | 0 | 1 | 0 |
| | 0 | 1 | 0 | 0 | 0 | 1 | 0 | 0 | 0 | 0 | 1 | 1 |
| | 0 | 1 | 1 | 0 | 0 | 1 | 0 | 0 | 0 | 1 | 0 | 0 |
| | 1 | 0 | 0 | 0 | 0 | 1 | 0 | 0 | 0 | 1 | 0 | 1 |
| | 1 | 0 | 1 | 0 | 0 | 1 | 0 | 0 | 0 | 1 | 1 | 0 |
| | 1 | 1 | 0 | 0 | 0 | 1 | 0 | 0 | 0 | 1 | 1 | 1 |
| | 1 | 1 | 1 | 0 | 0 | 1 | 0 | 1 | 0 | 0 | 0 | 0 |
| C | 0 | 0 | 0 | 0 | 0 | 0 | 1 | 0 | 1 | 1 | 1 | 1 |
| | 0 | 0 | 1 | 0 | 0 | 0 | 1 | 0 | 0 | 0 | 0 | 0 |
| | 0 | 1 | 0 | 0 | 0 | 0 | 1 | 0 | 0 | 0 | 0 | 1 |
| | 0 | 1 | 1 | 0 | 0 | 0 | 1 | 0 | 0 | 0 | 1 | 0 |
| | 1 | 0 | 0 | 0 | 0 | 0 | 1 | 0 | 0 | 0 | 1 | 1 |
| | 1 | 0 | 1 | 0 | 0 | 0 | 1 | 0 | 0 | 1 | 0 | 0 |
| | 1 | 1 | 0 | 0 | 0 | 0 | 1 | 0 | 0 | 1 | 0 | 1 |
| | 1 | 1 | 1 | 0 | 0 | 0 | 1 | 0 | 0 | 1 | 1 | 0 |
| D | 0 | 0 | 0 | 1 | 0 | 0 | 0 | 0 | 1 | 1 | 1 | 1 |
| | 1 | 1 | 1 | 0 | 1 | 0 | 0 | 1 | 0 | 0 | 0 | 0 |
| E | 0 | 0 | 0 | 1 | 0 | 1 | 0 | 0 | 0 | 0 | 0 | 0 |
| | 0 | 0 | 0 | 1 | 0 | 0 | 1 | 0 | 1 | 1 | 1 | 0 |
| | 1 | 1 | 1 | 0 | 1 | 1 | 0 | 1 | 0 | 0 | 0 | 1 |
| | 1 | 1 | 1 | 0 | 1 | 0 | 1 | 0 | 0 | 1 | 1 | 1 |

FIG. 11

United States Patent Office 3,460,131
Patented Aug. 5, 1969

3,460,131

SEQUENTIALLY GATED SUCCESSIVE APPROXIMATION ANALOG TO DIGITAL CONVERTER

George G. Gorbatenko, James Jursik, and Milton J. Kimmel, Rochester, Minn., Syed Razi, Mountain View, Calif., and Norman D. Wilson, Rochester, Minn., assignors to International Business Machines Corporation, Armonk, N.Y., a corporation of New York Filed July 23, 1965, Ser. No. 474,255
Int. Cl. H03k 13/02
U.S. Cl. 340—347 23 Claims

ABSTRACT OF THE DISCLOSURE

The disclosed successive-approximation converter has sequentially gated level-detection means for producing conversion digits from an analog signal, differential amplifiers which subtract analog representations of the stored conversion digits from the analog signal, and correction means for detecting conversion errors. An error causes an out-of-range analog signal at the level detectors, which results in the generation of a correction digit. The correction digit causes an output circuit to change the incorrect conversion digit to its proper value, and further causes its corresponding analog representation to be modified to a different magnitude. More than one correction digit may be employed.

The present invention relates to "successive approximation" analog to digital converters and, more particularly, to such a converter incorporating means operative during a conversion cycle to correct conversion errors occurring during the same cycle.

The so-called "successive approximation" technique of analog to digital conversion is a well known method for producing accurate and, when implemented through electronic means, relatively high speed digital conversions. Prior art electronic converters operating on this principle compare the unknown analog voltage to be digitized with one or a plurality of precisely known reference voltages in a series of digit generating comparison steps. In each step the relative magnitudes of the analog input or some fraction thereof and the reference voltage are compared and, based on this comparison, an "error" or difference voltage is generated which is compared with another reference voltage during the succeeding step. Each comparison step yields a digit of the final output and the digits are produced in descending digital order until the desired level of quantization is reached.

A characteristic common to all such prior art circuits is that each comparison decision made during the conversion is irrevocable. This means that the digits, once produced, cannot be changed and any incorrect digit resulting from an erroneous comparison degrades the accuracy of the final result. Incorrect comparisons may be caused by limitations in the comparison circuits themselves such as transient recovery and response and static accuracy or by transient errors in the circuits which supply the comparison circuits with voltages to be compared. These error generation factors coupled with the requirement for irrevocable comparison decisions set a limit on the effectiveness of the prior art conversion circuits as measured by their cost, speed and accuracy.

The speed of a successive approximation converter is determined by the amount of time required for the execution of each comparison. Since in the prior art circuits each comparison is irrevocable, sufficient time must be allowed prior to each comparison to permit the transient errors of the circuit to settle out to a necessary minimum level so that an accurate comparison may be made. This greatly increases the cost of high speed conversion circuits since the cost of circuit components is generally proportional to their level of dynamic stability (ability to settle out rapidly) as well as their static accuracy. Yet, even when economy is not a consideration and the fastest circuit components available today are employed, the minimum time necessary to accomplish the accurate analog switching operation required in prior art circuits for the production of one conversion digit is on the order of five microseconds. Of course, some improvement may be made on this relatively modest conversion speed by allowing less time for the circuits to settle after each comparison. However, this quite obviously sacrifices conversion accuracy.

It is therefore an object of the present invention to provide an analog to digital converter of the successive approximation type which is capable of higher speed, more accurate operation than prior art converters employing circuit components of a comparable tolerance level and cost.

Another object is to provide an analog to digital converter of the successive approximation type that is operable during a digit conversion cycle to correct erroneous output digits that may have been generated earlier in the cycle due to the aforementioned types of circuit inaccuracies.

Still another object is to provide an analog to digital converter of the successive approximation type which has the capability of operating with an allowable limit of error for each digit approximation step which is much higher than the error limit of the final output.

A further object is to provide a successive approximation analog to digital converter operable at a digit generation rate which is not dependent on the requirement that the circuit components of each approximation stage settle to their final stability level before the succeeding approximation step is begun.

Still a futher object is to provide an improved analog to digital converter that generates a plurality of parallel, binary-coded output bits for each conversion digit.

The converter of the present invention operates upon the principle that an incorrect comparison decision made during a digit generation step of a successive approximation conversion results in the generation of a difference voltage signal having a magnitude which is outside the range of voltages normally presented for comparison during the succeeding digit generation step. Taking into consideration the known tolerance level of the circuit and calculating the maximum error of which the circuit is capable in the worst case, the occurrence of such an out of range signal is an indication not only of the fact that an incorrect decision occurred during the preceding comparison but is an indication of the magnitude of the error as well. Consequently, in the circuit of the invention means are provided for detecting such out of range signals and for utilizing the information thus obtained to correct the previous error. Furthermore, means are provided for handling such out of range signal just as though they were normal difference signals resulting from the preceding comparison. This eliminates any necessity for "retracing" the conversion process after an error has been detected and corrected. Still further means are provided for performing such correction operations substantially at the instant they occur, therefore permitting execution of a conversion in substantially the same amount of time as would be required for a circuit not embodying the novel error correction feature of the invention.

The foregoing and other objects, features, and advantages of the invention will be apparent from the following more particular description of a preferred embodiment of the invention, as illustrated in the accompanying drawings.

In the drawings:

FIG. 11 is a chart showing all possible combinations of inputs to adder 801 and the outputs produced in response thereto.

Overall circuit

Figure 1:
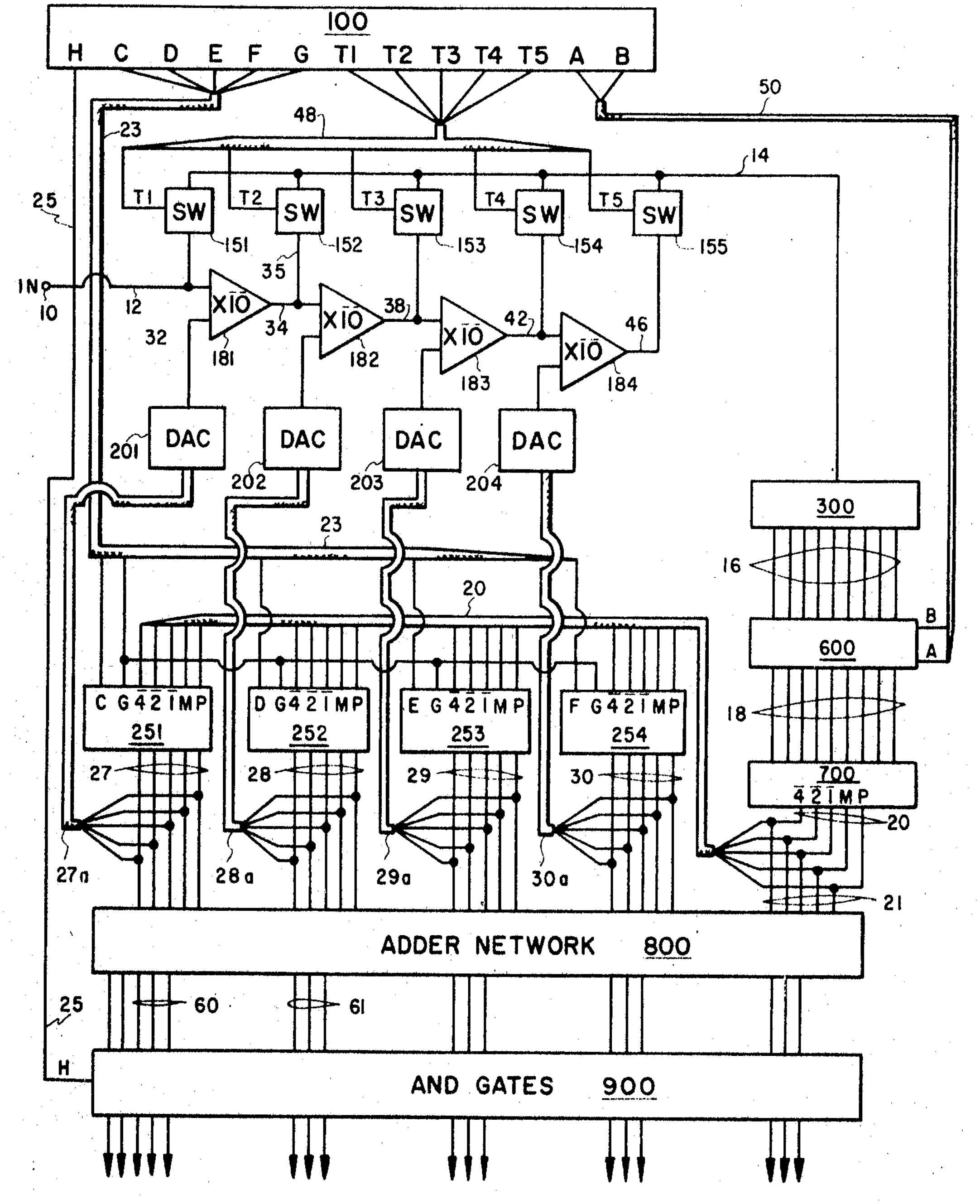
FIG. 1 is a schematic diagram showing the overall conversion circuit of the invention.

With reference to FIG. 1, the overall circuit of the invention is hereinafter described. The embodiment hereinafter described performs digital conversions in the octal system. The octal system employs the eight digits $\bar{0}$, $\bar{1}$, $\bar{2}$, $\bar{3}$, $\bar{4}$, $\bar{5}$, $\bar{6}$ and $\bar{7}$ (the horizontal bars are used to avoid confusion with the similar digit symbols used in decimal notation) and has a radix of $\overline{10}$ (decimal eight). For the sake of consistency and to avoid the cumbersome process of transforming values from octal to decimal and vice versa, all numerical quantities relating to circuit parameters are hereinafter expressed in octal notation. It is believed to be fully within the capabilities of one skilled in the analog conversion art to employ the principles hereinafter taught in performing conversions in the decimal or any other number system.

Analog input terminal 10 is connected to an analog voltage source such as, for example, a sample and hold amplifier which is fed by a time-varying voltage signal to be digitized. A steady-state input voltage is transmitted to the first digit generation stage of the analog to digital conversion (ADC) circuit via input line 12. This voltage is applied in parallel to the input terminal of a first analog switch 151 and to a first input port of a non-inverting, subtracting amplifier 181 having a gain of $\overline{10}$. The output line 34 of amplifier 181 is connected to the first input port of a second stage subtracting amplifier 182, also having a gain of $\overline{10}$. Likewise, the output line 38 from amplifier 182 is connected to the first input port of third stage times $\overline{10}$ subtracting amplifier 183 and the output line 42 of amplifier 183 is connected to the first input port of fourth stage times $\overline{10}$ subtracting amplifier 184 having an output line 46. Second, third, fourth and fifth digit stage analog switches 152, 153, 154 and 155, respectively have their input terminals connected to amplifier outpult lines 34, 38, 42 and 46, respectively. The output terminals of the five analog switches are connected to a common signal line 14 which is the input for a bank of comparator circuits 300. The switches are controlled by timing pulses issuing on bus 48 from a timing circuit 100.

The comparator circuit 300 comprises nine threshold circuits (differential amplifiers) each having a different voltage reference level. For simplicity of discription, it is herein assumed that the input range of the ADC circuit is $\overline{10}$ volts, i.e., the analog input signal at terminal 10 never falls below $\bar{0}$ volts and never exceeds $\overline{7.7777+}$ volts. The nine threshold circuits in comparator bank 300 are thus referenced to the respective voltage levels of $\bar{0}$ volt, $\bar{1}$ volt, $\bar{2}$ volts, $\bar{3}$ volts, $\bar{4}$ volts, $\bar{5}$ volts, $\bar{6}$ volts, $\bar{7}$ volts and $\overline{10}$ volts. It is, of course, understood that any desired voltage range and corresponding threshold levels may in actuality be employed. As will be hereinafter explained in detail, all threshold circuits of the circuit 300 which are referenced to a voltage level substantially equal to or below the level of the signal on input line 14 produce a positive level output signal. Those threshold circuits referenced to a voltage level higher than that on input line 14 produce no output signal.

Threshold circuit output signals issuing from comparator bank 300 in response to an analog signal on line 14 are fed via output lines 16 to a comparator register 600 where they are temporarily stored. The digital signals so stored appear on the nine output lines 18 of the register 600 as "one" or "zero" voltage levels and are applied to an encoding circuit 700. Circuit 700 converts the signal pattern appearing on the lines 18 to a single BCO digit representing the magnitude of the voltage reference level to which the actuated threshold circuit having the highest reference level is tied. In addition to this, circuit 700 generates an M or P correction bit when it is necessary to correct an erroneous comparison having occurred during the preceding digit generation period. The output from encode circuit 700 consists of three-bits of BCO information and two bits of correction information appearing on the five output lines 20. The numerical significance attached to the BCO signals on the "$\bar{4}$," "$\bar{2}$" and "$\bar{1}$" lines 20 is $\bar{4}$, $\bar{2}$ and $\bar{1}$ in accordance with binary convention. The outputs on the M and P lines are mutually exclusive.

The signals on the five-wire bus 20 are transmitted to four DAC storage registers 251, 252, 253 and 254. Each of these storage registers includes a five-position binary storage circuit. Also included in each register are means for selectively gating the signals on the bus 20 into selected ones of the registers in response to timing signals applied by circuit 100 via bus 23. BCO and correction information stored in the registers 251, 252, 253 and 254 is transmitted via the register output lines 27, 28, 29 and 30 both to an adder network 800 and to a plurality of digital to analog conversion (DAC) circuits 201, 202, 203 and 204, respectively.

As will be subsequently explained in detail, the added network responds to the BCO and correction bits stored in the DAC registers to transfer corrected BCO digit representations to output AND gates 900. The DAC circuits cooperate with their associated subtracting amplifiers in a manner hereinafter described in detail to produce a signal at the amplifier output which is $\overline{10}$ times the difference between the magnitude of the signal fed to the amplifier from the preceding stage and the magnitude of the voltage level represented by the digits stored in the DAC register associated with the particular amplifier. When a BCO digit is stored in the DAC register without a correction bit accompanying it, the voltage level presented to the corresponding amplifier by the associated DAC circuit is proportional to the stored BCO digit. When a correction bit accompanies the BCO digit, the voltage level presented to the amplifier is one of two ter 600 as "one" or "zero" voltage levels and are applied the correction bit is an M bit or a P bit.

At the end of a five-digit conversion cycle, the corrected BCO signals appearing at the outputs of adder network 800 are gated to desired utilization circuits through the output AND gates 900 by a pulse issuing on line 25 from circuit 100.

Overall circuit operation assuming no error

Figure 3:
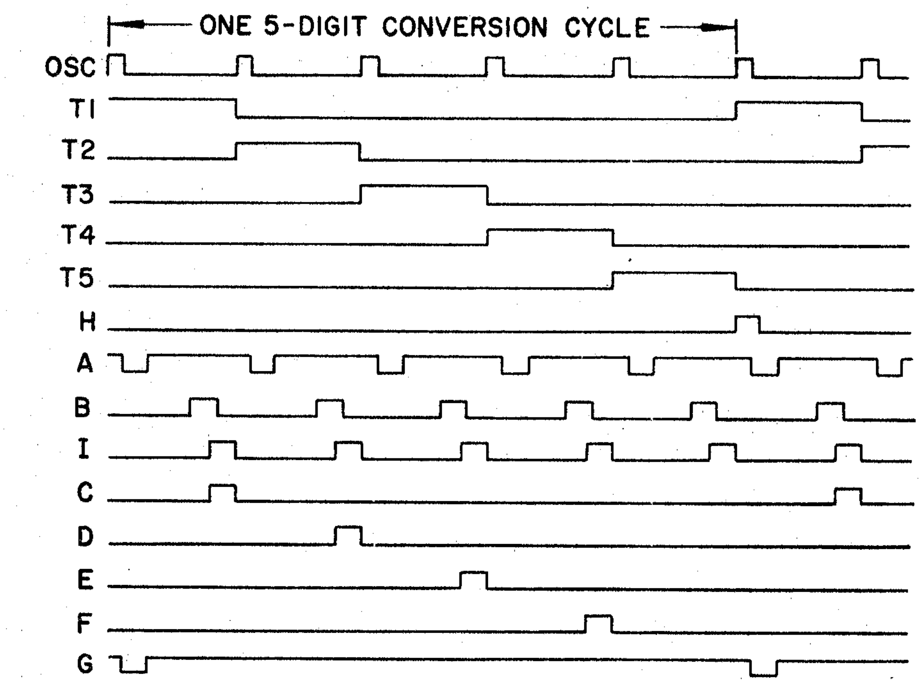
FIG. 3 is a timing diagram illustrating the time relationship between the various output pulses produced by the timing circuit of FIG. 2.

With reference now to FIGS. 1 and 3, a description is hereinafter given of the operation of the circuit of FIG. 1 in performing a five digit conversion of an analog input signal having a magnitude equal to $\overline{5.7246}$ volts. For the purposes of this portion of the description it is assumed that the threshold circuits in comparator bank 300 make correction decisions during each digit generation period.

At the beginning of the cycle, timing circuit 100 supplies a pulse T1 over a multi-wire bus 48 to close the switch 151, transferring the analog input signal on line 12 to comparator input line 14. The analog signal thus presented to comparator bank 300 actuates the six threshold circuits therein referenced to the respective voltage levels $\bar{0}$ volt, $\bar{1}$ volt, $\bar{2}$ volts, $\bar{3}$ volts, $\bar{4}$ volts and $\bar{5}$ volts. Output signals are thus generated on six of the lines 16. Immediately after switch 151 closes and during the time that its output is settling to a reasonably steady state, negative-going pulses A and G are issued from timing circuit 100 over multi-wire buses 50 and 23, respectively, to reset the comparator register 600 and the DAC registers 251, 252, 253 and 254. Next, a positive-going pulse B is issued over bus 50 to gate the signals on output lines 16 from comparator bank 300 into the comparator register 600.

It is to be noted that the gating pulse B does not appear until near the end of the interval of pulse T1. This allows a maximum amount of time for the transient effects generated on line 14 due to the closing of switch 151 to settle out. As soon as the comparator register has been loaded in response to pulse B and the output signals on the lines 16, encode circuit 700 generates an output signal on the lines 20 consisting of a signal on the "$\bar{4}$" line and a signal on the "$\bar{1}$" line, representing the digit $\bar{5}$. This BCO signal on the lines 20 is presented to the inputs of DAC register 251 and gating pulse C issues over bus 23 to enter it into the register. The number thus stored in register 251 represents the most significant digit of the output and its presence in the register signifies the completion of the first digit generation period.

As soon as digit signals are available on output lines 27 from the register 251, they are presented to the inputs of DAC circuit 201 via the multi-wire bus **27*a*. These digital inputs into the circuit 201 precisely alter the voltage presented to the amplifier 181 by DAC circuit 201 such that by superposition an output is produced from the amplifier having a magnitude which is $\overline{10}$ times the difference between the magnitude of the signal on line 12 ($\overline{5.7246}$ volts) and the magnitude of the voltage level ($\bar{5}$ volts) represented by the BCO digits stored in DAC register 251. The magnitude of the signal on line 34** is therefore $\overline{7.246}$ volts.

At substantially the same time the output signals became available on lines 27 from DAC register 251, timing pulse T1 terminated and pulse T2 was initiated to begin the second digit generation period. Signal transients caused by the activation of the switches and resistors in DAC circuit 201, by the change in inputs to amplifier 181, by the opening of switch 151 and the closing of switch 152 are thus all substantially simultaneously initiated and allowed to settle during substantially the same period. This conserves circuit time and avoids the situation in which subsequent circuit elements cannot be activated with accuracy until prior elements have settled out.

The new signal on comparator input line 14 ($7.\overline{246}$ volts) actuates the threshold circuits in comparator bank 300, referenced, respectively, to the levels $\bar{0}$ volt, $\bar{1}$ volt, $\bar{2}$ volts, $\bar{3}$ volts, $\bar{4}$ volts, $\bar{5}$ volts, $\bar{6}$ volts, and $\bar{7}$ volts. This produces output signals on eight of the lines 16. During the time in which the new signal on line 14 was stabilizing and the threshold circuits in the comparator bank were setting out, a second A pulse issued on timing bus 50 to reset comparator register 600. A second B pulse then issues on timing bus 50 to load the stabilized signals on output lines 16 into the comparator register. The ensuing presence of "one" signals on eight of the output lines 18 from the register 600 causes encode circuit 700 to issue signals on its "$\bar{4}$," "$\bar{2}$" and "$\bar{1}$" output lines 20 to signify the digit $\bar{7}$. This BCO signal, representing the second most significant output digit, is transmitted via the bus 20 to the inputs of DAC register 252 whereupon it is caused to be stored therein by a gating pulse D which issues on bus 23. The presence of this output digit on the output lines 28 of register 252 signifies completion of the second digit generation period and activates the inputs, vis bus **28*a*, of DAC circuit 202. The digital inputs into DAC 202 precisely alter the voltage presented to the amplifier by DAC 202 such that by superposition an output is produced from the amplifier having a magnitude which is $\overline{10}$ times the difference between the magnitude of the signal on line 34 ($\bar{7}.\overline{246}$ volts) and the magnitude of the voltage level ($\bar{7}$ volts) represented by the BCO digits stored in register 252. The magnitude of the signal on line 38 is therefore $\bar{2}.\overline{46}$ volts. At substantially the same time the output signals became available on lines 28 from DAC register 252**, timing pulse T2 terminated and pulse T3 was initiated to begin the third digit generation period.

As the transients due to activation of the circuits 202, 182, 152 and 153 are settling and the input line 14 of comparator bank 300 is approaching its new voltage level of $\bar{2}.\overline{46}$ volts, a third A pulse issues on timing bus 50 to reset comparator register 600. Thereafter a third B pulse gates the new pattern of threshold output signals on the lines 16 into the register 300, setting up output signals on three of the lines 18. Encode circuit 700 responds with a single output signal on its "$\bar{2}$" output line representative of the magnitude ($\bar{2}$) of the third most significant output digit. This signal is gated into DAC register 253 by timing pulse E causing modification of the inputs to DAC 203 via the multi-wire bus **29*a*. An output voltage on line 42 of $\bar{4}.\bar{6}$ volts is obtained from amplifier 183 in the same manner as previously described in connection with amplifiers 181 and 182**. At this time the timing pulses T3 and T4 terminate and initiate, respectively, to begin the fourth digit generation period.

Thereafter, comparator register 600 is reset by a fourth A pulse and comparator input line 14 receives, after transients due to the activation of the circuits 203, 183, 153 and 154 have settled, a new voltage level equal to $\bar{4}.\bar{6}$ volts. This causes five of the lines 16 to transmit output signals to the register 600 and, after a fourth B pulse has gated the signals into the register 600 causes encode circuit 700 to issue a signal on its output lines 20 representative of the digit $\bar{4}$ which is the fourth most significant output digit. This digit is gated into DAC register 254 by gating pulse F transmitted from timing circuit 100 via bus 23 causing the activation of DAC 204 whereby a voltage having a magnitude of $\bar{6}.\bar{0}$ is generated on line 46 from amplifier 184 in a manner previously described in connection with amplifiers 181 and 182.

Thereafter, pulse T4 terminates and T5 is initiated to begin the fifth and final digit generation period. After a fifth A pulse has reset comparator register 600 and the transients due to the activation of the circuits 204, 184, 154 and 155 have settled, a new voltage level equal to $\bar{6}.\bar{0}$ volts appears on line 14. A fifth B pulse then gates the new signal pattern appearing on lines 16 into the register 600, causing seven of the lines 18 to produce output signals. Encode circuit 700 thereafter responds with signals on its "$\bar{4}$" and "$\bar{2}$" output lines 20 representing the final digit $\bar{6}$, which signals are transmitted by lines 21 to the adder network 800. Since all comparisons were performed correctly by the circuit 300, the five BCO output digits $\bar{5}$, $\bar{7}$, $\bar{2}$, $\bar{4}$ and $\bar{6}$ appearing respectively on the lines 27, 28, 29, 30 and 21 pass through the adder network 800 without change and are presented to output AND gates 900. Just prior to the occurrence of the intial A and G reset pulses of the ensuing digit conversion cycle, a pulse H issues from circuit 100 on line 25 to activate all the AND gates 900, thereby transferring the digital outputs from the adder network to any desired external utilization circuits (not shown). Thereafter, a new analog input voltage is presented on input terminal 10 and another five-digit conversion is performed as above described.

Circuit operation assuring an incorrect comparator decision

There are two types of incorrect decisions that a threshold circuit in comparator bank 300 can make. These two types of "misfires" are herein termed "malfires" and "nonfires." The former type of misfire is caused when a threshold circuit fires when it should not have fired and the latter is caused when a threshold circuit does not fire when it should have fired. To illustrate the occurrence of a malfire, assume that the analog input signal is, as in the illustration above, $\overline{5.7246}$ volts. This is very close to $\overline{6}$ volts, and the threshold circuit in comparator bank 300 which is referenced to a $\overline{6}$ volt potential, in malfiring because of static inaccuracies in its own circuit, misinterprets this input voltage as being equal to or about $\overline{6}$ volts and produces an erroneous output signal. The circuit could also malfire if the input presented to it was actually equal to or above $\overline{6}$ volts due to error in the analog switch 151 or in the circuits preceding input line 12. This latter error condition might also be caused during digit generation periods other than the first due to transient error in the radix amplifier supplying the input signal. Such a comparator malfire sets up an "underflow" condition in the converter which initiates a first correction procedure.

To illustrate a comparator nonfire, assume that the magnitude of the analog input signal is $\overline{5.0246}$ volts. The comparator circuit referenced to $\overline{5}$ volts, in nonfiring because of static inaccuracies in its own circuit, misinterprets this voltage as not being equal to or above its reference level and thus does not fire. Such a nonfire could also be caused by error in the digit stage analog switch 151 or in a circuit preceding it resulting in a comparator input which is actually below $\overline{5}$ volts. As mentioned above, the latter error condition might also be caused in digit stages subsequent to the first by transient error in the radix amplifier supplying the analog input signal. When an incorrect decision of this type is made, an "overflow" condition is set up in the converter which initiates a second correction procedure.

Referring now to FIG. 1 these two correction procedures, which form the essence of the present invention, are hereinafter described. As mentioned above in describing a comparator malfire, the $\overline{5.7246}$ volt input signal causes the seven threshold circuits referenced to the respective potentials of $\overline{0}$ volt, $\overline{1}$ volt, $\overline{2}$ volts, $\overline{3}$ volts, $\overline{4}$ volts, $\overline{5}$ volts and $\overline{6}$ volts to fire during the first digit generation period. The seven output signals thus produced on output lines 18 from the comparator register 600 cause encode circuit 700 to produce output signals on its "$\overline{4}$" and "$\overline{2}$" output lines to erroneously indicate that the analog input voltage is equal to or above $\overline{6}$ volts. The BCO digit thus represented on the lines 20 is stored in DAC register 251 causing a $\overline{6}$ volt level to be represented by DAC circuit 201. When the subtracting amplifier 181 subtracts this level from the original analog input signal and multiplies the resulting difference by $\overline{10}$, the magnitude of the signal on output line 34 is $-\overline{0.532}$ volt. When this negative level is presented by switch 152 to the comparator bank 300 during the following digit generation period, none of the threshold circuits therein are actuated and no output signals appear on the lines 16. The second B pulse to comparator register 600 therefore does not gate any "one" level signals into the register and the output lines 18 therefrom all remain at the "zero" level.

The all-zero input thus transmitted to encode circuit 700 causes the encoding logic therein to set up "zero" output signals on the $\overline{4}$, $\overline{2}$, $\overline{1}$ and P output lines 20 and a "one" signal on the M output line. Timing pulse D thereafter gates this combination of output signals into DAC register 252, causing the same combination of signals to appear on output lines 28. These signals, when fed to DAC 202 via the bus 28*a* cause the circuits therein to represent to amplifier 182 a predetermined underflow correction level equivalent to $-\overline{1}$ volt. This minus level when subtracted from the analog input signal on line 34 results in an output signal on line 38 having a magnitude equal to $+\overline{2.46}$ volts. The magnitude of this signal is exactly the same as it would have been had the $\overline{6}$ volt threshold circuit in comparator bank 300 not malfired during the first digit generation period. The analog signal has thus been corrected and the conversion proceeds through the third, fourth and fifth digit generation periods in exactly the same manner as above described for the no-error case.

The BCO $\overline{0}$ which is represented on the $\overline{4}$, $\overline{2}$ and $\overline{1}$ output lines from the register 252 is, due to the presence of the M correction bit, altered in being transferred through the adder network 800 and appears as a BCO $\overline{7}$ on output lines 61. Also, the M correction bit causes the BCO $\overline{6}$ represented on the $\overline{4}$, $\overline{2}$ and $\overline{1}$ output lines from DAC register 251 to be transferred through the adder network so that the digital output represented on the output lines 60 is a BCO $\overline{5}$. The M correction bit therefore also causes the correction of the digital output.

To illustrate the analog and digital correction operation which is performed in the event of an overflow condition, it is assumed that the analog input signal on input line 12 has a magnitude of $\overline{5.0246}$ volts. As previously mentioned, the overflow condition is caused by the nonfiring of the $\overline{5}$ volt threshold circuit in comparator bank 300. In this event only the $\overline{0}$ volt, $\overline{1}$ volt, $\overline{2}$ volt, $\overline{3}$ volt and $\overline{4}$ volt threshold circuits fire producing five "one" level input signals to encode circuit 700 during the first digit generation period. This firing pattern is encoded to represent a BCO $\overline{4}$ which is transmitted via bus 20 to the DAC storage register 251. When a corresponding level is presented to amplifier 181 by the DAC circuit 201, the resulting analog signal on line 34 has a magnitude of $\overline{10.246}$ volts. This signal, when presented to the comparator bank 300 through switch 152 during the following digit generation period actuates all nine of the comparator threshold circuits producing output signals on all nine of the output lines 16. This comparator firing pattern is presented to encode circuit 700 by the comparator register output lines 18 and causes "one" level signals to be generated on the $\overline{4}$, $\overline{2}$, $\overline{1}$ and P output lines 20 from the circuit 700. This combination of signals is then gated into DAC register 252 by timing pulse D and thereafter appears on output lines 28 to be presented both to DAC circuit 202 and to adder network 800. The circuit 202, when it receives the $\overline{4}$, $\overline{2}$, $\overline{1}$ and P input signals causes a predetermined overflow correction level equivalent to $+\overline{10}$ volts to be represented to the amplifier 182 via line 35. The output from amplifier 182 is thus an analog signal having a magnitude of $\overline{2.46}$ volts. This is exactly the same signal level that would have been generated by amplifier 182 had the $\overline{5}$ volt threshold circuit in comparator bank 300 fired correctly in the first instance. In addition, the adder network 800 responds to the P correction bit stored in DAC register 252 to transfer to output AND gates 900 on lines 61 signals representative of a BCO $\overline{0}$ rather than the BCO $\overline{7}$ represented by the outputs from DAC register 252. Also, the P correction bit causes adder network 800 to transfer a BCO $\overline{5}$ to the AND gates 900 via lines 60 rather than the BCO $\overline{4}$ stored in DAC register 251. The remaining three digit generation periods are completed in the manner previously described for the no-error case.

In both of the above described error correction procedures, incorrect comparisons were made during the first digit generation period. It is to be understood that incorrect comparisons made during any of the other digit generation periods or during all digit generation periods are corrected in exactly the same manner by the circuits of the digit stage following that in which the error occurred. As is apparent from the above descriptions, error correction in the converter of the invention is based upon the premise that an incorrect comparator decision made during any given digit generation period causes a difference signal to be generated which is outside the range of voltage levels which could possibly be presented for comparison during the next digit generation period under normal error-free operation. That is to say, since the input range of the converter is between $\overline{0}$ and $\overline{10}$ volts, the threshold circuits in comparator bank 300 will be presented with voltage levels no higher than $\overline{7.7777}^{+}$ volts and no lower than $\overline{0}$ volts during a conversion operation wherein only correct comparison decisions are made. Should any incorrect decision be made due to any of the causes previously discussed, a difference voltage which is outside this range is presented to the comparator bank. The existence of this out of range voltage is detected either by the $\overline{10}$ volt threshold circuit or the $\overline{0}$ volt threshold circuit whereupon the correction procedures described are initiated through generation of the P or M correction bits by the encode circuit 700.

DETAILED CIRCUIT DESCRIPTION

Timing circuit 100

Figure 2:
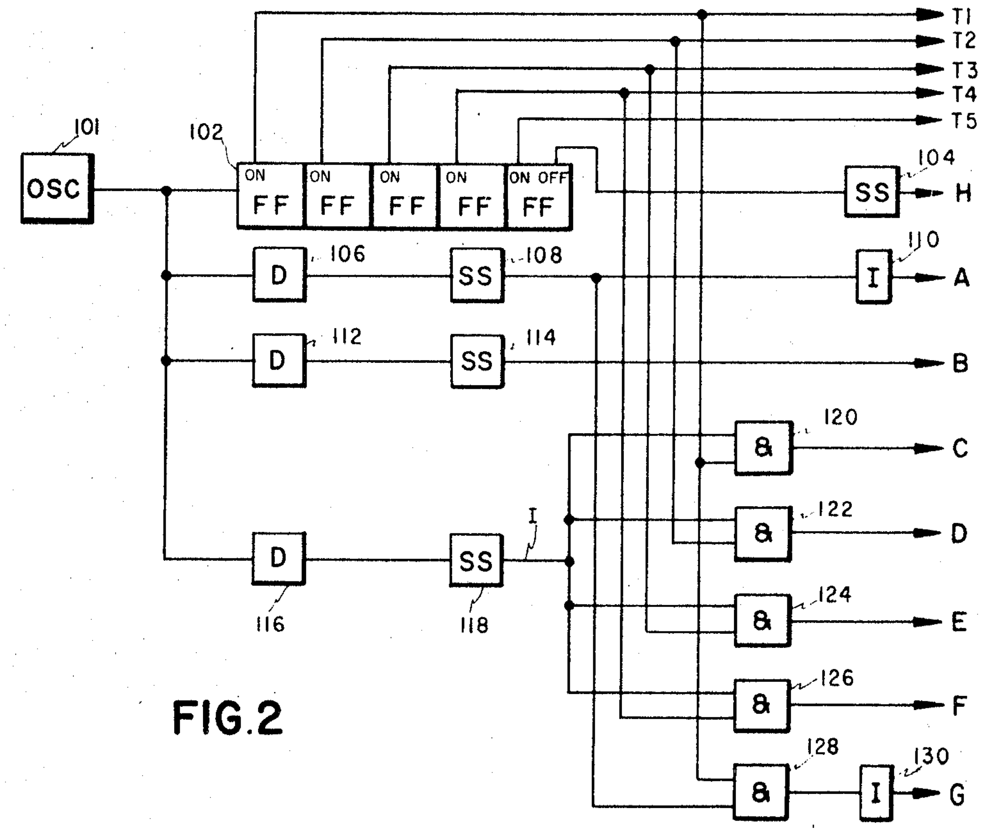
FIG. 2 is a schematic diagram of the timing circuit 100.

FIG. 2 shows, in schematic form, one embodiment of a circuit which may be employed for the timing circuit 100 of FIG. 1 to produce the various waveforms shown in FIG. 3. An oscillator circuit 101 produces, in a continuous sequence, the output pulses shown at the top of the waveform diagram of FIG. 3. These pulses are fed to the inputs of ring circuit 102 and of delay circuits 106, 112 and 116. The ring circuit 102 comprises a plurality of bistable flip-flops interconnected in a well-known fashion so that only one of the flip-flops can be on at a given time and such that each pulse applied at the input to the ring turns off the flip-flop then on and turns on the next succeeding flip-flop in the ring. The timing pulses T1 through T5 are taken from the respective "on" outputs of the flip-flops in the ring.

The "off" output of the final flip-flop in the ring is connected to a singleshot multivibrator 104, the output from which supplies the waveform H used to gate the digital output from AND gates 900 at the end of each conversion cycle. Singleshot 104 is triggered only by positive-going transitions, thus produces the pulse H only once per conversion cycle, i.e., when the end flip-flop is turned off at the termination of timing pulse T5.

Delay circuit 106 has its output connected to the input of a singleshot multivibrator 108 which in turn is connected to an inverter 110. The output of the latter circuit yields the negative-going A pulses which are used to reset the comparator register 600 immediately following initiation of each of the timing pulses T1–T5. Delay circuit 106 may be any of the various well-known types of delay circuits and provides an amount of delay as indicated in FIG. 3 by the time differential between the leading edge of an oscillator output pulse and the leading edge of the succeeding A pulse.

Delay circuit 112 feeds the input of a singleshot multivibrator 114, the output of which supplies the B pulses which are used to load comparator register 600 during the latter portion of each of the timing intervals T1–T5. The amount of delay provided by the circuit 112 is illustrated in FIG. 3 by the time differential between the leading edge of an oscillator pulse and the leading edge of the succeeding B pulse.

Delay circuit 116 has its output connected to the input of a singleshot multivibrator 118 which produces the waveform I which is transmitted to a first input of each of a plurality of AND circuits 120, 122, 124 and 126. The second input to each of these AND circuits is supplied from the "on" output of each of the first four flip-flops of the ring circuit 102. The output signals generated by AND circuits 120, 122, 124 and 126 are the waveforms C, D, E and F, respectively, which are used to load the output from encoding circuit 700 into the DAC registers 251, 252, 253 and 254. As can be determined from FIG. 3, the amount of delay required in circuit 116 is proportional to the distance from the leading edge of an oscillator pulse to the leading edge of the succeeding I pulse.

AND circuit 128 produces an output pulse coinciding with the first A pulse of each digit conversion cycle. This pulse is fed to an inverter 130, the output from which supplies the negative-going G pulse used to reset all of the DAC registers at the beginning of each digit conversion cycle.

Input switches, radix amplifiers and DAC circuits

Figure 4:
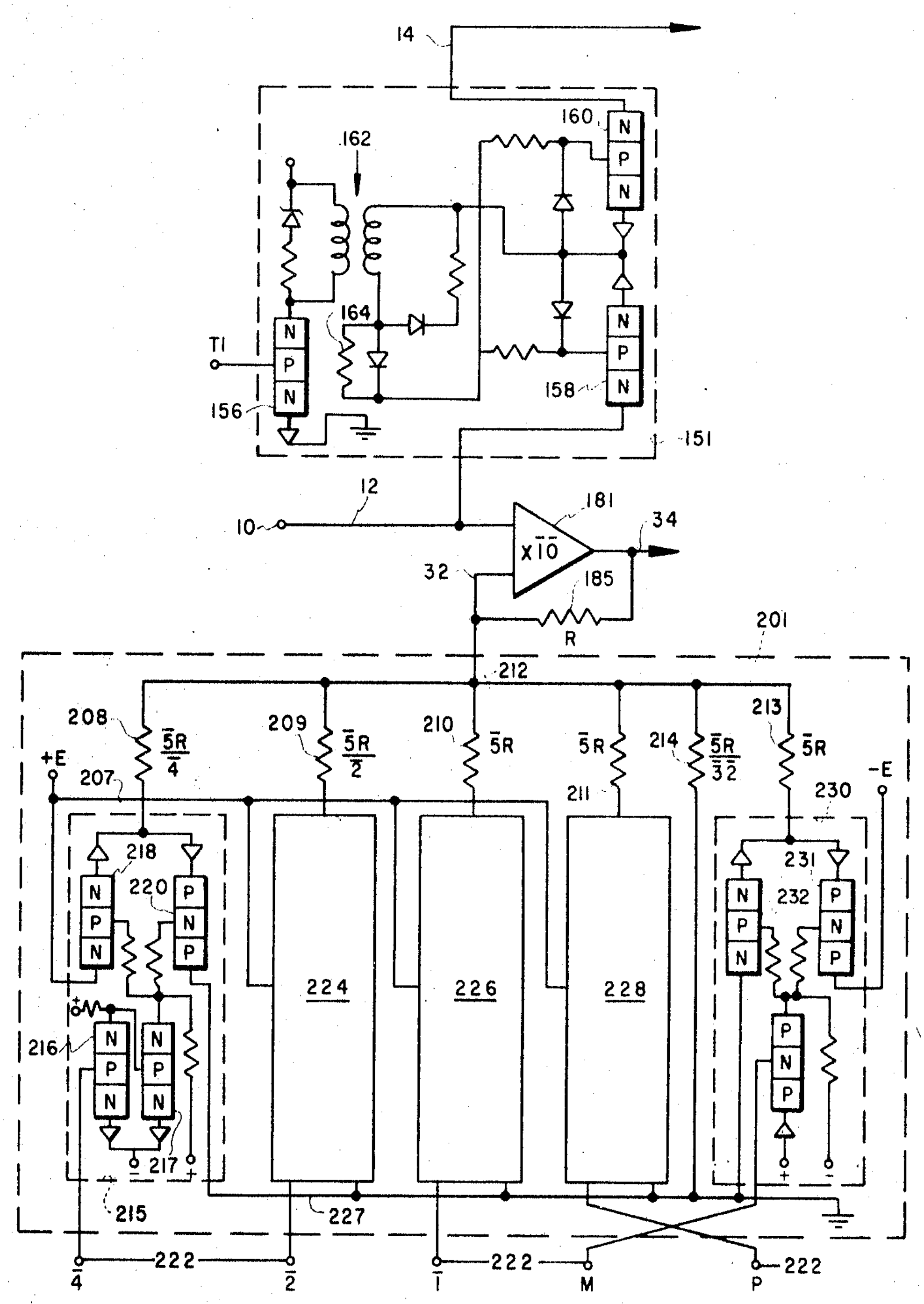
FIG. 4 is a circuit diagram showing the circuit details of the first digit generation stage input switch 151 and digital to analog converter 201.
Figure 5:
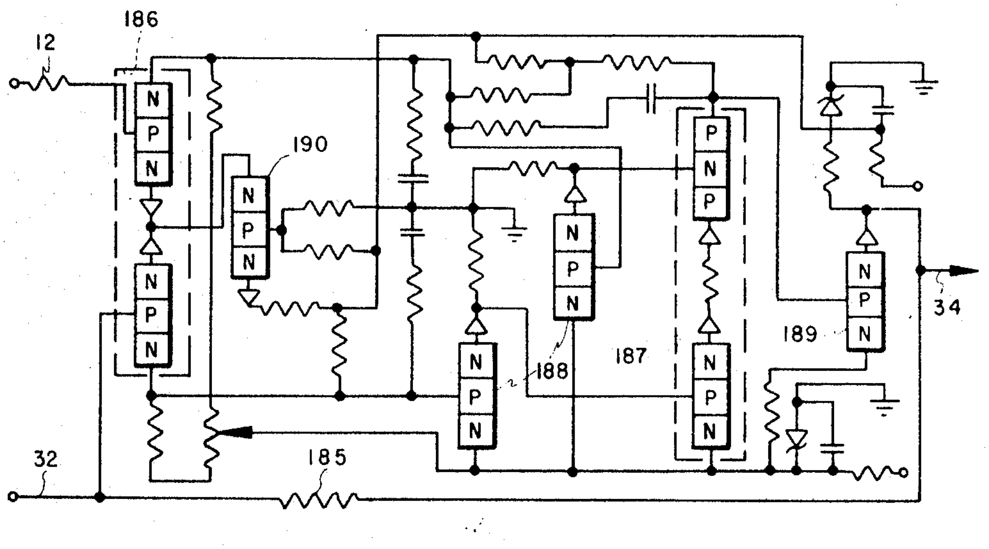
FIG. 5 is a circuit diagram of radix amplifier 181.

With reference to FIGS. 4 and 5, a detailed description of input switch 151, radix amplifier 181 and digital to analog converter circuit 201 of the first digit generation stage is hereinafter given. It is to be understood that the corresponding circuits of each of the succeeding digit generation stages are identical in structure and operation to those of the first stage and that detailed descriptions of them is unnecessary. Input switch 151 (FIG. 4) includes control transistor 156, input transformer 162 and a pair of signal path transistors 158 and 160. Timing pulse T1 is supplied over bus 48 from the timing circuit 100 to the base of transistor 156. The leading, positive-going edge of T1 saturates transistor 156 and causes a current pulse to be drawn through the primary winding of transformer 162. This pulse begins driving the transformer toward its saturation point producing an output voltage across the secondary, which voltage is applied across the base to emitter junctions of both signal path transistors 158 and 160, driving them into saturation. This opens a low impedance analog signal path to transfer the analog input signal on input line 12 to comparator input line 14 through the collector to emitter conduction paths of the transistors 158 and 160.

The bandwidth and duty cycle characteristics of transformer 162 are chosen so that the voltage pulse induced across the secondary is a relatively good reproduction of the input pulse T1. When T1 terminates, transistors 158 and 160 are rapidly driven out of saturation by means of a sharply dropping pulse produced through the conduction path provided by resistor 164. This re-opens the switch 151 to cut off the connection between input line 12 and comparator input line 14.

The radix amplifier 181, shown schematically in FIG. 4 and in detail in FIG. 5, is a DC, non-inverting, subtracting amplifier having a fixed gain of $\overline{10}$ from its input port 12 to its output 34. Two conventional gain stages 186 and 187 are interconnected by a double emitter follower 188. An emitter follower 189 transmit the output from the second gain stage 187 to output line 34. A constant current source 190 is used to increase the common mode rejection ratio of the first gain stage 186. A feedback resistor 185 is connected from output line 34 to the second input port 32. The DAC circuit 201, shown in detail in FIG. 4, is also a part of the amplifier feedback circuit and acts in accordance with digital inputs received at its input terminals 222 from DAC register 251 to reduce the signal on line 34 so that it is $\overline{10}$ times the difference between the signal on line 12 and the magnitude of the voltage level represented by the digital signals applied to terminals 222.

DAC circuit 201 includes three resistors 208, 209 and 210 having the respective resistance values of $\overline{5}R/\overline{4}$, $\overline{5}R/\overline{2}$ and $\overline{5}R$ in the binary ratio of $\overline{1}:\overline{2}:\overline{4}$. One end of each end of these resistors is connected to a common junction point 212. The other ends the resistors 208, 209, 210 are connected to the output terminals of the single pole, double throw (SPDT) switches 215, 224 and 226, respectively. Reference potentials of +E and $\overline{0}$ volts are supplied to the switches via the lines 207 and 227, respectively. Control inputs are supplied to the switches from the DAC input terminals 222 which, as previously mentioned, receive control signals via the $\overline{4}$, $\overline{2}$ and $\overline{1}$ lines of bus *27a* from the output lines 27 of DAC register 251.

The SPDT switches 215, 224 and 226 are identically constructed and only the circuit for switch 215 is shown in detail. The switch includes a pair of control transistors 216 and 217 and a pair of switch transistors 218 and 220. The DAC input signal received on the $\overline{4}$ terminal 222 is transmitted to the base of transistor 216. When a positive-going signal signifying a "one" bit appears on the line, transistor 216, which is of the NPN type, becomes conducting, causing a negative-going signal transition to occur at the base of transistor 217. This turns transistor 217 off and causes positive-going transitions to be presented to the bases of both transistors 218 and 220. Since the latter transistors are of the NPN and PNP types, respectively, transistor 218 is rendered conductive and 220 nonconductive. This connects resistor 208 through a low impedance path to the voltage line 207, connecting the voltage +E into the feedback path of amplifier 181 through the resistor 208. When no digit signal is received at the $\overline{4}$ terminal 222, transistor 216 remains nonconductive and the voltage levels at the bases of transistors 218 and 220 stay down, sustaining the former in a nonconducting state and the latter in a conducting state. This connects the $\overline{0}$ volts (ground) of the line 227 into the feedback path of amplifier 181 through the resistor 208.

To implement analog signal correction in accordance with the principles of the invention, an additional pair of resistors 211 and 213, having resistance values of $\overline{5}$R, are connected to junction point 212 and, through a pair of SPDT switches 228 and 230, are adapted to receive reference voltage levels of +E or ground and −E or ground, respectively. The control input to switch 228 is supplied by the P input terminal 222 while the control input to switch 230 is taken from M input terminal 222. Switch 228 is constructed identically to switch 215 and the switch 230 includes two switch transistors 231 and 232 driven by a PNP control transistor. When a "one" level signal is applied to M terminal 222, transistor 231 is biased into conduction and transistor 232 into nonconduction. This opens a path to apply the −E potential to the resistor 213. When a "zero" level signal is received at the M input terminal, transistor 232 is switched into conduction and transistor 231 into nonconduction, applying ground potential to resistor 213.

A shunt resistor 214 having a resistance value of $\overline{5}R/\overline{32}$ is connected from junction point 212 to ground line 227 in order to render the value of the equivalent resistance of the network including $R_{208}$, $R_{209}$, $R_{210}$, $R_{211}$, $R_{213}$ and $R_{214}$ proper for operation in accord with the principles set forth below.

The gain of amplifier 181 from input port 12 to output line 34 is calculated as follows:

$$G=\frac{R_{185}+R_e}{R_e}$$

where $R_e$ equal the equivalent resistance of $R_{208}$, $R_{209}$, $R_{210}$, $R_{211}$, $R_{213}$ and $R_{214}$. Since $$\frac{\overline{1}}{R_e}=\frac{\overline{4}}{\overline{5}R}+\frac{\overline{2}}{\overline{5}R}+\frac{\overline{1}}{\overline{5}R}+\frac{\overline{1}}{\overline{5}R}+\frac{\overline{32}}{\overline{5}R}+\frac{\overline{1}}{\overline{5}R}$$

$R_e=R/\overline{7}$. Since the value of resistor 185 is equal to R, $$G=\frac{R+\frac{R}{\overline{7}}}{\frac{R}{\overline{7}}}=\overline{10}$$

The output voltage $V_o$ one line 34 under any given set of input conditions may be represented as follows:

$$V_o\overline{10}V_{in}-R_{185}\left[\frac{X_{215}E}{R_{208}}+\frac{X_{224}E}{R_{209}}+\frac{X_{226}E}{R_{210}}+\frac{X_{228}E}{R_{211}}+\frac{X_{230}(-E)}{R_{213}}\right] \quad (1)$$

where the values of $X_{215}$, $X_{224}$, $X_{226}$, $X_{228}$ and $X_{230}$ are $\overline{1}$ if the control inputs to the respective switches 215, 224, 226, 228 and 230 are "one" and are $\overline{0}$ if the input signals to the respective switches are "zero."

Thus, for example, if the input voltage on line 12 is equal to $\overline{5}.\overline{5}$ volts, the digital feedback signals to the input terminals 222 of DAC circuit 201 from the encoding circuit 700 represent (assuming no comparator error) the BCO digit $\overline{5}$ and appear as "one" input signals to the switches 215 and 226. The signal on output line 34 from the amplifier 181 in accordance with Equation 1 is thus:

$$V_o=\overline{10}\times\overline{5}.\overline{5}-R\left(\frac{E}{\frac{\overline{5}R}{\overline{4}}}+\frac{E}{\overline{5}R}\right)=\overline{55}-E$$

With the reference voltage E set at a constant $\overline{50}$ volts, the output on line 34 is equal to the required $\overline{5}.\overline{0}$ volts. Taking another example, if the input on line 12 is $\overline{3}.\overline{5}$ volts, the output is (assuming no comparator error)

$$V_o=\overline{10}\times\overline{3}.\overline{5}-R\left(\frac{\overline{50}}{\frac{\overline{5}R}{\overline{2}}}+\frac{\overline{50}}{\overline{5}R}\right)$$

$$=\overline{35}-R\left(\frac{\overline{170}}{\overline{5}R}\right)=\overline{5}.\overline{0}\text{ volts}$$

To illustrate the operation of the analog signal correction circuits, assume that the amplifier shown in FIG. 4 is other than a first digit stage amplifier and that its input on line 12 coming from the preceding digit stage amplifier has a magnitude of $-\overline{0}.\overline{255}$ volt, signifying the occurrence of a threshold circuit malfire during the preceding digit generation period. This negative input signal is applied through switch 151 to the comparator bank and causes encode circuit 700 to initiate the underflow correction procedure by issuing a "one" M signal and "zero" $\overline{4}$, $\overline{2}$, $\overline{1}$ and P signals. When this combination of signals is applied to input terminals 222 of DAC circuit 201, resistors 208, 209, 210 and 211 are grounded by their switches and the resistor 213 is connected to the −E reference potential by the switch 230. The magnitude of the signal thus produced on amplifier output line 34 is calculated in accordance with Equation 1 as follows:

$$V_o=\overline{10}\times(-\overline{0}.\overline{255})-R\left(\frac{-\overline{50}}{\overline{5}R}\right)=+\overline{5}.\overline{23}\text{ volts}$$

The amplifier output of $+\overline{5}.\overline{23}$ volts is thus $\overline{10}$ times the difference between the analog input signal on line 12 and an underflow correction level of $-\overline{1}$ volt, the latter being set up by the application of the M correction signal to DAC 201.

To illustrate the manner in which DAC circuit 201 corrects the analog signal in the case of an overflow, assume that the magnitude of the input on line 12 to amplifier 181 is $\overline{10}.\overline{255}$ volts resulting from a threshold circuit nonfire occurring during the preceding digit generation period. The combination of input signals presented to the terminals 222 by encode circuit 700 is thus a "zero" level M signal and "one" level $\overline{4}$, $\overline{2}$, $\overline{1}$ and P signals. The magnitude of the signal produced on output line 34 in response to this combination of inputs is calculated in accordance with Equation 1 as follows:

$$V_o=\overline{10}\times\overline{10.255}-R\left(\frac{\overline{50}}{\frac{5R}{\overline{4}}}+\frac{\overline{50}}{\frac{5R}{\overline{2}}}+\frac{\overline{50}}{5R}+\frac{\overline{50}}{5R}\right)$$

$$=\overline{102.55}-R\left(\frac{\overline{500}}{5R}\right)=\overline{2.55}\text{ volts}$$

The amplifier out of $+\overline{5.23}$ volts is thus $\overline{10}$ times the lent to $\overline{10}$ times the magnitude of the difference between the analog input signal on line 12 and the $\overline{10}$ volt overflow correction level set up in DAC circuit 201 in response to the 11101 combination of input signals applied to it.

Comparator bank 300 and comparator register 600

Figure 6:
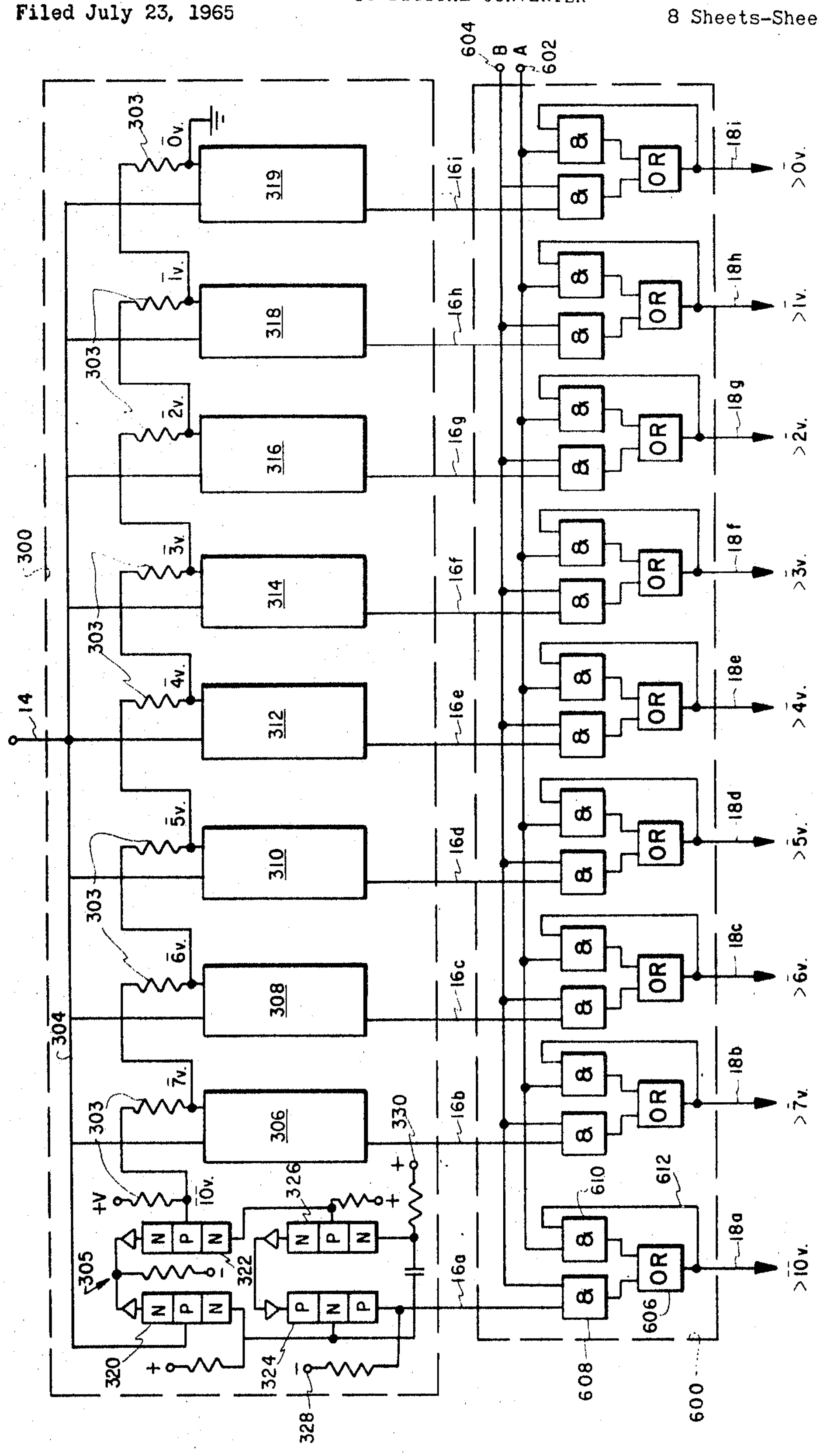
FIG. 6 is a schematic diagram of the comparator circuit 300 and the comparator register 600.

The comparator bank 300 and comparator register 600 are shown in detail in FIG. 6. Comparator bank 300 comprises a group of nine threshold circuits (differential amplifiers) 305, 306, 308, 310, 312, 314, 316, 318 and 319. The input to the comparator bank 300 is supplied from line 14 and each threshold circuit receives the signal thereon via a line 304.

Each threshold circuit is connected to a different voltage reference level established by a voltage divider including the resistors 303 connected between the source of reference potential +V and ground. As shown, the threshold circuits 305, 306, 308, 310, 312, 314, 316, 318 and 319 receive reference voltage levels of $\overline{10}$ volts, $\overline{7}$ volts, $\overline{6}$ volts, $\overline{5}$ volts, $\overline{4}$ volts, $\overline{3}$ volts, $\overline{2}$ volts, $\overline{1}$ volt and $\overline{0}$ volt, respectively. Any signal on output line 14 having a magnitude substantially equal to or in excess of the voltage reference level of a given threshold circuit causes that circuit to produce a positive output signal on its respective output line 16.

All threshold circuits are identically constructed and only the details of circuit 305 are shown. The circuit arrangement is that of simple differential amplifier having input transistors 320 and 322, a control transistor 326 and an output transistor 324. When the signal on line 304 has a magnitude below $\overline{10}$ volts, transistors 320 and 322 are biased into non-conducting and conducting states, respectively. This sustains both the transistors 324 and 326 in non-conduction and output line 16a is maintained at a minus level established by the bias potential applied at terminal 328. When the signal on line 304 is raised above $\overline{10}$ volts, the states of transistors 320, 322, 324 and 326 are reversed and a positive-going output "one" signal is produced on the line 16a. The remaining threshold circuits 306, 308, 310, 312, 314, 316, 318 and 319 operate in an identical fashion except that they are actuated to produce output signals in accord with their respective different threshold levels.

Comparator register 600, also shown in FIG. 6, comprises nine bistable logic circuits, each consisting of a pair of AND circuits 608 and 610 and an OR circuit 606. As shown in the waveform diagram of FIG. 3, the waveform A, which is applied to terminal 602, is normally held at a positive level and is pulsed negatively to reset the register positions. In the reset condition, the outputs of both AND circuits 608 and 610 and the OR circuit 606 of each register position are in the down or "zero" condition. When a positive B pulse is applied to terminal 604, all the left-hand AND circuits 608, each of which is also connected to an output line from one of the comparator circuits, are partially enabled. Each AND circuit also receiving a "one" level signal from its comparator output line passes an output signal through its OR circuit 606. This signal is fed back to the input of AND 610 via line 612 and "latches" the output of AND 610 up due to the presence of the normally positive level applied at terminal 602. This output signal remains until a negative-going A reset pulse is applied at terminal 602. The output signals thus appearing on the output lines 18a–18i from the register 600 are a stored representation of the last occurring firing pattern generated on comparator output lines 16a–16i.

Encode circuit 700

Figure 7:
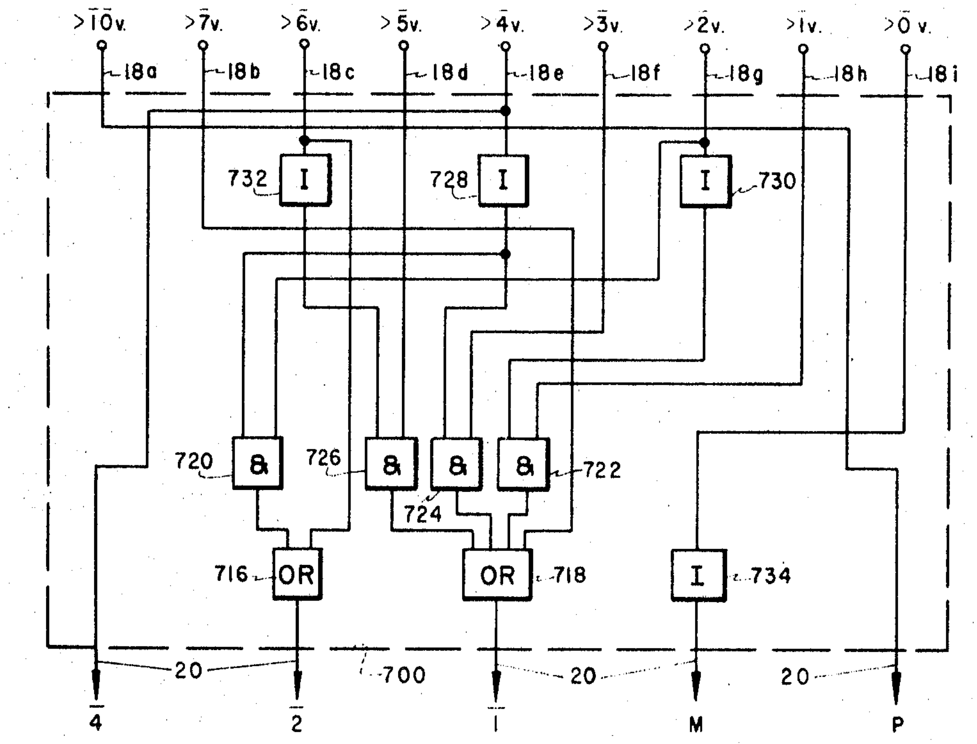
FIG. 7 is a schematic diagram of the encode circuit 700.

The circuit details of encode circuit 700 are shown in FIG. 7. The circuit 700 has as its inputs the nine comparator register output lines 18a–18i. The pattern of signals present on these lines is converted by the circuit 700 to a BCO representation of the voltage reference level of the actuated threshold circuit in comparator bank 300 having the highest reference level or, if a "one" signal is present on line 18a or if none of the lines 18a–18i are activated, the combination of signals on output lines 20 represent a predetermined correction level.

Input line 18a is connected directly to the P output line. The line 18b is connected to an input of an OR circuit 718, the output of which is connected to the $\overline{1}$ output line. Input line 18c is connected through an inverter 732 to an AND circuit 726, the output of which is connected to a second input of OR 718. In addition, input line 18c is connected directly to an input of an OR circuit 716, the output of which is connected to the $\overline{2}$ output line 20. Line 18d is connected to the second input of AND 726. Line 18e is connected directly to the $\overline{4}$ output line and, through an inverter 728, to inputs of a pair of AND circuits 720 and 724. Input line 18f is connected to the second input of AND 724. Line 18g is connected to the second input of AND 720 and, through an inverter 730, to an input of an AND circuit 722. Line 18h is connected to the second input of AND 722. Line 18i is connected through an inverter 734 to the M output line.

If none of the lines 18a–18i receive "one" inputs, the combination of output signals on the $\overline{4}$, $\overline{2}$, $\overline{1}$, M and P output lines is 00010. As previously discussed, this combination of output signals initiates the underflow correction procedure. If line 18i is the only input line activated, the output lines 20 transmit the combination 00000. This represents the magnitude of the reference potential ($\overline{0}$ volts) supplying the actuated threshold circuit in comparator bank 300 having the highest threshold level. If only lines 18h and 18i receive input signals, the signals on the output lines are 00100. If signals are received on the lines 18g, 18h and 18i, the output lines 20 transmit the signals 01000 and when signals are received on the four input lines 18f, 18g, 18h and 18i, the combination of signals on output lines 20 is 01100. If signals are received on the lines 18e, 18f, 18g, 18h and 18i, the output combination 10000 is generated and if signals are received on the six input lines 18d–18i, output signals 10100 are transmitted. If the seven input lines 18c–18i receive "one" signals, the output lines 20 assume the condition 11000 and if all input lines except line 18a receive input signals, the output lines 20 transmit 11100. When all input lines receive "one" signals, the output lines transmit the signal combination 11101 to initiate the overflow correction procedure.

DAC register 251

Figure 8:
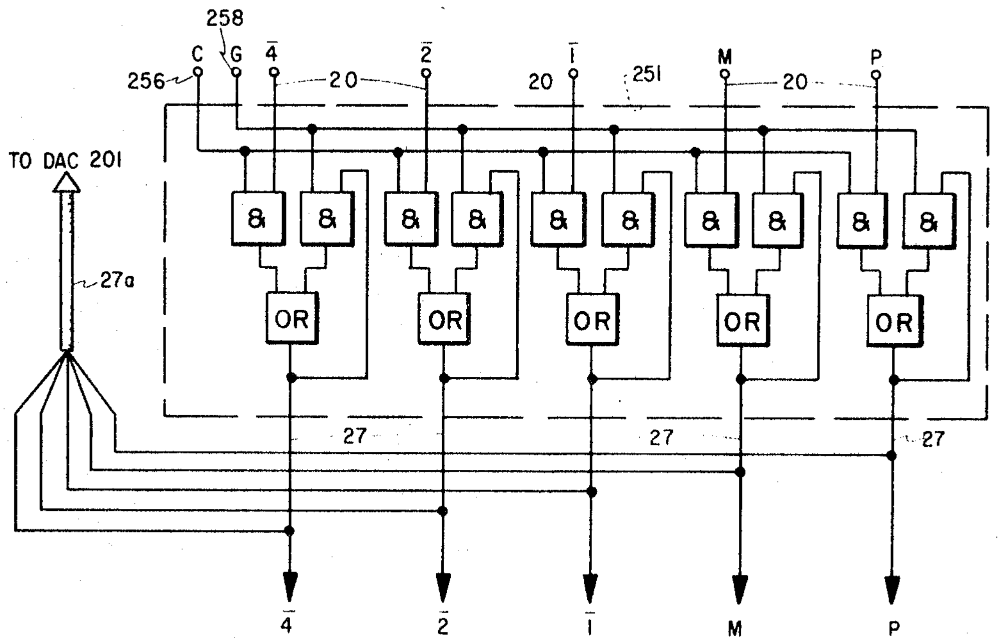
FIG. 8 is a schematic diagram of the first stage DAC register 251.

The circuit details of DAC register 251 are shown in FIG. 8. The DAC registers 252, 253 and 254 are constructed identically to the circuit 251, except that they respond to different timing pulses, and their detailed descriptions are therefore unnecessary. The register 251 comprises five AND-OR latch circuits identical to those employed in the comparator register 600, previously described. The negative-going reset pulse G is applied to input terminal 258 from timing bus 23 and is transmitted to the right-hand AND circuit of each register position. The G pulse resets each latch circuit in the same manner, previously described, that the A pulse resets each of the latch circuits of the register 600. The BCO and correction signals presented from encode circuit 700 via the $\overline{4}$, $\overline{2}$, $\overline{1}$, M and P lines 20 are gated through the left-hand AND circuits of each of the five latches by the timing pulse C applied to input terminal 256 from timing bus 23 and are stored in the latches in the manner previously described with regard to the register 600. BCO and correction signals stored in the register appear on the $\bar{4}$, $\bar{2}$, $\bar{1}$, M and P output lines 27 thereof. These signals are transmitted to the inputs of an adder circuit in the adder network 800, described below, and, via the bus 27*a*, to the inputs of DAC circuit 201.

Adder network 800

Figure 9:
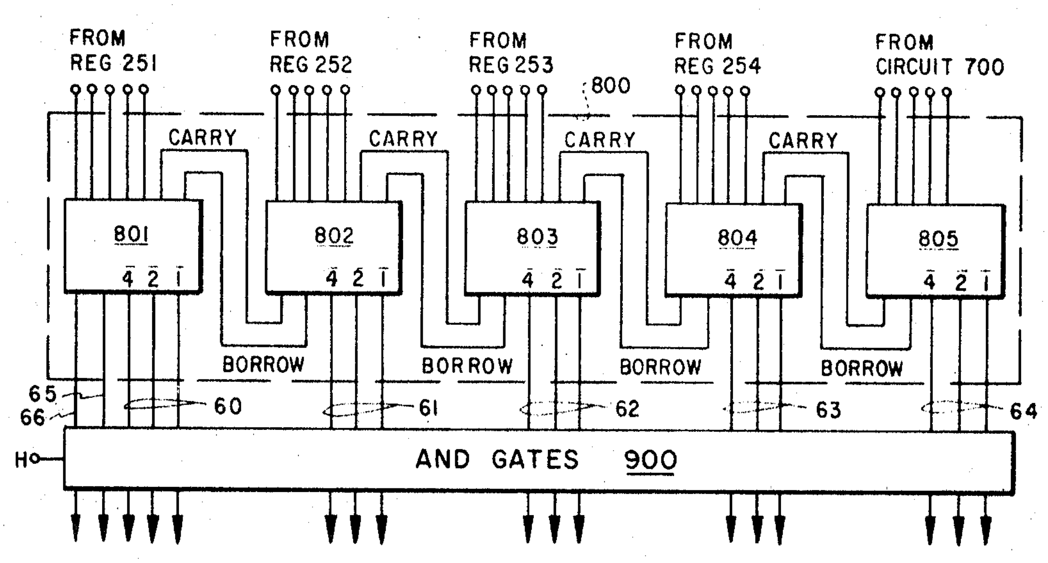
FIG. 9 is a schematic diagram showing the general arrangement of the adder network 800 and its relationship with the output AND gates 900.

The general organization of adder network 800 is shown in FIG. 9. Five adder circuits 801, 802, 803, 804 and 805 receive the output signals from DAC registers 251, 252, 253, 254 and encode circuit 700, respectively. In addition, each adder circuit receives a "carry" and "borrow" input signal from the adjacent right-hand adder circuit and generates its own "carry" and "borrow" output signals which, except in the case of circuit 801, are transmitted to the adjacent left-hand adder circuit. Each adder circuit generates a three-bit BCO output digit on the respective output lines 60, 61, 62, 63 and 64. These digit signals represent the final corrected ADC output and are transmitted to the inputs of AND gates 900 for presentation to external circuitry upon the occurrence of gating pulse H. The "carry" and "borrow" signals generated by adder 801 are also transmitted, via output lines 65 and 66, to the AND gates. Signals on these lines indicate that the original analog input signal presented to the ADC is outside either the positive or negative range of the converter.

Figure 10:
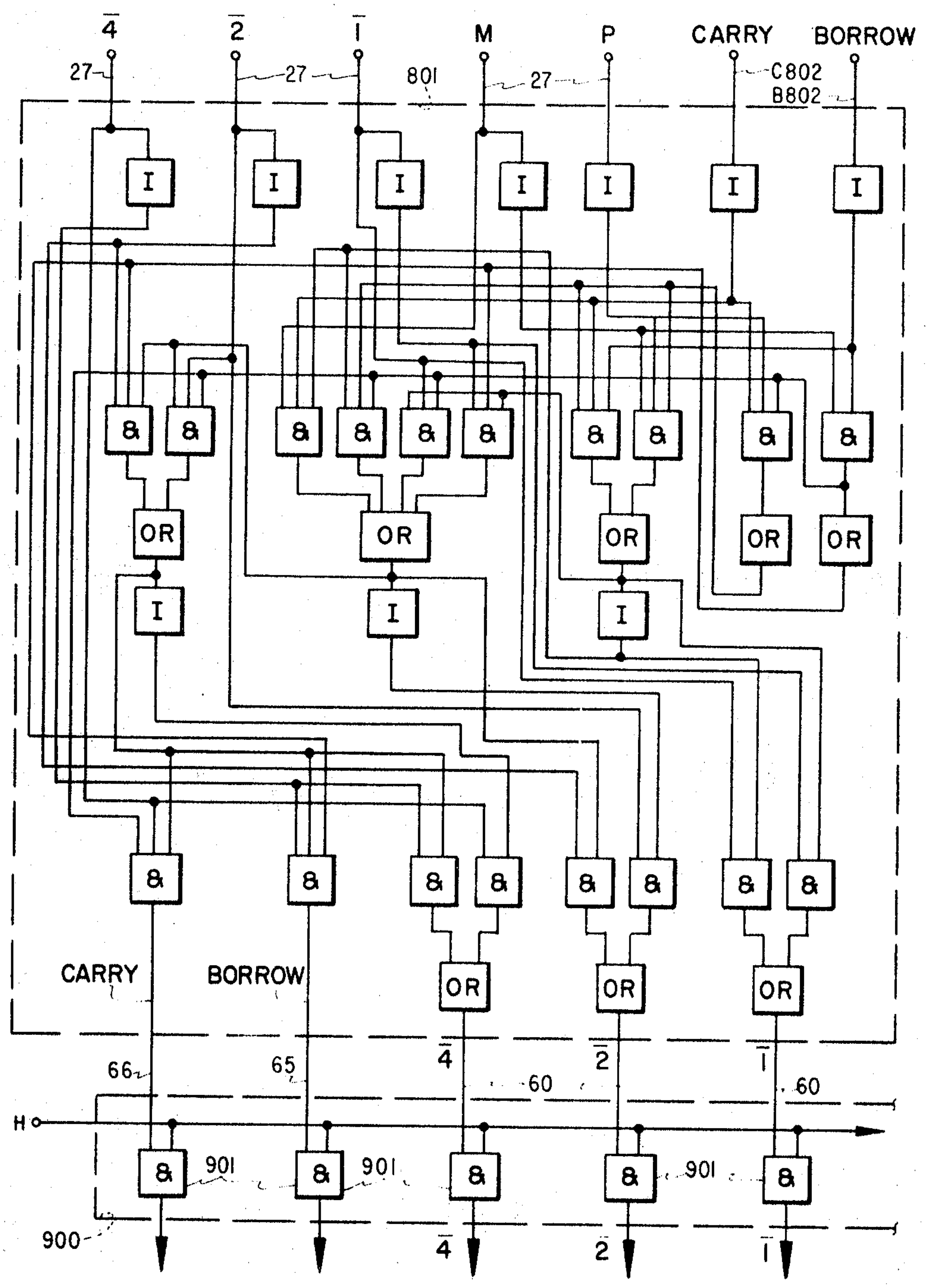
FIG. 10 is a circuit diagram of the adder circuit 801 and the AND gates 900 associated therewith shown in FIG. 9.

The circuit details of adder 801 and of the AND gates 900 associated therewith are shown in FIG. 10. The adder circuits 802, 803, 804 and 805 and the AND gates associated therewith are identical to the circuit of FIG. 10 and therefore are not herein described.

The inputs to adder 801 consist of the five output lines 27 from DAC register 251 and carry and borrow input lines C802 and B802 from adder 802. The outputs from adder 801 consist of carry and borrow lines 66 and 65 and three BCO digit lines 60. The signals appearing on the lines 60 which are gated through the corresponding AND circuits 901 by gating pulse H at the completion of a conversion cycle are a BCO representation of the most significant ADC output digit. The signals appearing on the lines 65 and 66 and gated through corresponding AND circuits 901 by the pulse H are, as previously mentioned, an indication that the original analog input signal to the ADC was either above the positive input limit ($\bar{7}.\bar{7}\bar{7}\bar{7}\bar{7}+$ volts) or below the negative input limit ($\bar{0}$ volts) of the circuit.

The operation of adder circuit 801 is best explained with reference to the input-output chart of FIG. 11. The A group of inputs represent the digits $\bar{0}$ through $\bar{7}$ unaccompanied either by correction bits or by carry or borrow bits from adder 802. The outputs corresponding to these combinations of inputs are simply a transfer of the BCO input signals.

The B group of inputs again represent the BCO digits $\bar{0}$ through $\bar{7}$ but this time are accompanied by a carry input bit from adder 802. As noted from the corresponding outputs, the carry bit adds $\bar{1}$ to the BCO input digit. Note that a carry signal is generated at the adder output when the BCO input digit is $\bar{7}$.

The C group of inputs represent the digits $\bar{0}$ through $\bar{7}$ accompanied by a borrow signal from adder 802. The borrow signal subtracts $\bar{1}$ from the BCO input digit. Note that when the input signals represent a BCO $\bar{0}$, the output signals represent a BCO $\bar{7}$ with a borrow.

The D group of inputs illustrate the operation of the adder circuit in performing digital correction in response to underflow and overflow conditions detected in the comparator bank and set up by the encode circuit. The first inputs represent a BCO $\bar{0}$ accompanied by an M correction bit. In response to this combination of inputs, the adder circuit generates at its output a BCO$\bar{7}$ and a borrow signal. For overflow correction, the input signals represent a BCO $\bar{7}$ accompanied by a P correction bit. The circuit corrects this to a BCO $\bar{0}$ and a carry signal.

The E group of inputs again show the inputs for underflow and overflow correction, but this time the inputs are accompanied by either a carry or a borrow signal from adder 802. The top line of inputs are those produced in an underflow correction situation with a carry from adder 802. The effect of the carry input is to add $\bar{1}$ to the normal underflow correction output with the result that the BCO $\bar{7}$ signals are changed to BCO $\bar{0}$ signals and the borrow is cancelled. The second line of inputs represents underflow correction inputs accompanied by a borrow signal from adder 802. The circuit thus subtracts $\bar{1}$ from the normal underflow correction output with the result that the BCO $\bar{7}$ signals are changed to BCO $\bar{6}$ signals. The third line of inputs are the overflow correction inputs accompanied by a carry. The effect of the carry signal is to add $\bar{1}$ to the normal combination of overflow correction outputs which produces BCO signals representing a $\bar{1}$ with a carry. The last line of inputs are overflow correction inputs accompanied by a borrow. In subtracting $\bar{1}$ from the normal overflow correction outputs the circuit changes the signals representing a BCO $\bar{0}$ to signals representing a BCO $\bar{7}$ and cancels the carry.

While the embodiment of the invention herein described performs a conversion in the octal number system, it is to be understood that the circuit could, by slight modification, be made to operate in any number system. For example, to perform a decimal conversion, two more threshold circuits would have to be added to the comparator bank 300 and a like number of storage positions added to the register 600. Encode circuit 700 would require minor modifications to convert the firing pattern on the eleven output lines of the register 600 to binary-coded-decimal. One addition output line 20 would be needed to represent the "8" digit position. Further, an extra storage position would have to be added to each of the registers 251, 252, 253 and 254 and an extra input switch and resistor would be required in each of the DAC circuits 201, 202, 203 and 204. Finally, the radix amplifiers 181, 182, 183 and 184 would have to be modified to provide a gain of 10.

Further, although the extent of quantization provided by the embodiment of the invention herein described is five digits, this is in no way intended to serve as a limitation since any number of digit stages, within reasonable limits allowing for circuit practicalites, may be utilized.

It is apparent that greatly improved analog to digital conversion is accomplished by the ADC circuit herein described since the novel error correction feature permits the use of less accurate and less costly threshold circuits in the comparator bank and further allows the operation of the circuits under "controlled error" conditions. By this is meant that the analog signal presented to the comparator bank by the switch 151 at the beginning of the first digit generation period does not have to settle out to its final value before the outputs from the comparator bank are sampled. This could cause the most significant output digit to be generated erroneously. However, by the time switch 152 closes to present a second analog signal to the comparator bank, the original signal on line 12 and radix amplifier 181 have had time to settle out and the difference signal on line 34 reflects a more accurate measure of the original input. This difference signal therefore causes the circuit to perform a correction whereby the initial erroneous representation of the most significant output digit is changed to the correct value. Since this same theory of operation pertains for the analog signal presented at the beginning of each digit generation period the time saving inherent in this type of operation is significant.

It is also apparent that the error correction capacity of the circuit is governed by the predetermined levels which are subtracted from the analog signal during the correction procedures. In the embodiment described, only one correction level is provided for underflow correction and only one level is provided for overflow correction. The correction capacity of the circuit can be extended to handle any magnitude of out of range signals by employing additional out of range threshold circuits in the comparator bank. These circuits would thus discriminate between a plurality of out of range levels and would initiate a corresponding plurality of correction procedures.

While the invention has been particularly shown and described with reference to a preferred embodiment thereof, it will be understood by those skilled in the art that the foregoing and other changes in form and details may be made therein without departing from the spirit and scope of the invention.

We claim:

1. A circuit for performing an analog to digital conversion, comprising:
means for supplying an analog signal;
signal level detection means receiving said analog signal and producing a first output indicative of a digit of said conversion;
storage means;
gating means for transferring a representation of said digit to said storage means;
output means for transferring the digit representation stored in said storage means for external utilization;
difference means for producing a signal indicative of the difference between the level represented by the representation stored in said storage means and the magnitude of said analog signal;
means operative when the magnitude of said analog signal lies outside the range of said signal level detection means for generating a second output representative of a correction digit and for presenting a representation of said correction digit to said gating means for transfer to said storage means along with said representation of said conversion digit, whereby a representation of a predetermined correction level is stored in said storage means; and
means operative in response to storage of said representations of said digit and said correction digit to condition said output means to transfer a representation of a digit different in value by 1 from that indicated by said first output.

2. A circuit for performing an analog to digital conversion, comprising:
means for supplying an analog signal;
a plurality of difference amplifying means, each having a first and a second input and an output, said means being serially interconnected with the output of each connected to the first input of the next, the first said means in said series having its first input connected to said analog signal supply means;
signal level detection means sequentially receiving signals from said analog signal supply means and from the outputs of said amplifying means and sequentially producing output signals indicative of the digits of said conversion;
feedback means sequentially operative to cause the signal levels represented by said output signals to be presented to the second inputs of said amplifying means, thereby causing each respective amplifying means to produce a difference signal representing the amplified difference between the magnitude of the signal applied to the first input of said respective amplifying means and the level represented by one of said output signals; and
correction means operative when the magnitude of the signal applied to the first input of an amplifying means lies outside the range of said signal level detection means to inhibit the amplifying means receiving said out of range signal from producing said difference signal.

3. A circuit for performing an analog to digital conversion, comprising:
means for supplying an analog signal;
a plurality of difference amplifying means, each having a first and a second input and an output, said means being serially interconnected with the output of each connected to the first input of the next, the first said means in said series having its first input connected to said analog signal supply means;
signal level detection means sequentially receiving signals from said analog signal supply means and from the outputs of said amplifying means and sequentially producing output signals indicative of the digits of said conversion;
feedback means sequentially operative to cause the signal levels represented by said output signals to be presented to the second inputs of said amplifying means, thereby causing each respective amplifying means to produce a difference signal representing the amplified difference between the magnitude of the signal applied to the first input of said respective amplifying means and the level represented by one of said output signals; and
correction means operative when the magnitude of the signal applied to the first input of an amplifying means lies outside the range of said signal level detection means to cause the amplifying means receiving said out of range signal to amplify the difference between the magnitude of said out of range signal and a predetermined correction level.

4. A circuit for performing an analog to digital conversion, comprising:
means for supplying an analog signal;
a plurality of difference amplifying means, each having a first and a second input and an output, said means being serially interconnected with the output of each connected to the first input of the next, the first said means in said series having its first input connected to said analog signal supply means;
signal level detection means sequentially receiving signals from said analog signal supply means and from the outputs of said amplifying means and sequentially producing output signals indicative of the digits of said conversion;
feedback means sequentially operative to cause the signal levels represented by said output signals to be presented to the second inputs of said amplifying means;
first correction means operative when the magnitude of the signal applied to the first input of an amplifying means lies below the range of said signal level detection means to cause the amplifying means receiving said out of range signal to amplify the difference between the magnitude of said out of range signal and a first predetermined correction level; and
second correction means operative when the magnitude of the signal applied to the first input of an amplifying means lies above the range of said signal level detection means to cause the amplifying means receiving said out of range signal to amplify the difference between the magnitude of said out of range signal and a second predetermined correction level.

5. A circuit for performing an analog to digital conversion, comprising:
means for supplying an analog signal;
a plurality of amplifying means serially interconnected with the output of each connected to the input of the next, the first said means in said series having its input connected to said analog signal supply means;
signal level detection means sequentially receiving signals from said analog signal supply means and from the outputs of said amplifying means and producing an output signal indicative of a digit of said conversion in response to each said input signal;

output means for transferring representations of said digits for external utilization; and correction means operative when the magnitude of the signal applied to the input of an amplifying means lies outside the range of said signal level detection means to cause said output means to transfer different digit representations in place of those indicated by the output signals generated in response to said out of range input signal and the input signal received by the amplifying means preceding in said series the amplifying means receiving said out of range signal.

6. A circuit for performing an analog to digital conversion, comprising:

means for supplying an analog signal;

a plurality of amplifying means serially interconnected with the output of each connected to the input of the next, the first said means in said series having its input connected to said analog signal supply means;

signal level detection means sequentially receiving signals from said analog signal supply means and from the outputs of said amplifying means and producing an output signal indicative of a digit of said conversion in response to each said input signal;

output means for transferring representations of said digits for external utilization; and correction means operative when the magnitude of the signal applied to the input of an amplifying means lies outside the range of said signal level detection means to cause said output means to transfer different digit representations in place of those indicated by the output signals generated in response to said out of range input signal and the input signal received by the amplifying means preceding in said series the amplifying means receiving said out of range signal, the digits represented by said different digit representations being different in value by 1 from those which they replace.

7. A circuit for performing an analog to digital conversion, comprising:

means for supplying an analog signal;

a plurality of amplifying means serially interconnected with the output of each connected to the input of the next, the first said means in said series having its input connected to said analog signal supply means;

signal level detection means sequentially receiving signals from said analog signal supply means and from the outputs of said amplifying means and producing an output signal indicative of a digit of said conversion in response to each said input signal;

output means for transferring representations of said digits for external utilization;

first correction means operative when the magnitude of the signal applied to the input of an amplifying means lies above the range of said signal level detection means to cause said output means to transfer two different digit representations in place of the two indicated by the output signals generated in response to said out of range input signal and the input signal received by the amplifying means preceding in said series the amplifying means receiving said out of range signal, said two different representations representing the two lowest order digits of a number greater by 1 than the number indicated by said replaced output signals; and second correction means operative when the magnitude of the signal applied to the input of an amplifying means lies below the range of said signal level detection means to cause said output means to transfer two different digit representations in place of those two indicated by the output signals generated in response to said out of range input signal and the input signal received by the amplifying means preceding in said series the amplifying means receiving said out of range signal, said last mentioned two different digit representations representing the two lowest order digits of a number less by 1 than the number indicated by said last mentioned replaced output signals.

8. A circuit for performing an analog to digital conversion, comprising:

means for supplying an analog signal;

a plurality of difference amplifying means, each having a first and a second input and an output, said means being serially interconnected with the output of each connected to the first input of the next, the first said means in said series having its input connected to said analog signal supply means;

signal level detection means sequentially receiving signals from said analog signal supply means and from the outputs of said amplifying means and sequentially producing outputs indicative of the digits of said conversion;

storage means;

gating means for transferring representations of said digits to said storage means;

feedback means sequentially operative to cause the signal levels represented by said digit representations stored in said storage means to be presented to the second inputs of said amplifying means, thereby causing each respective amplifying means to produce a difference signal representing the amplified difference between the magnitude of the signal applied to the first input of said respective amplifying means and the level represented by one of said stored digit representations; and correction means operative when the magnitude of the signal applied to the first input of an amplifying means lies outside the range of said signal level detection means for generating an output representative of a correction digit and for presenting a representation of said correction digit to said gating means for transfer to said storage means along with said representation of said conversion digit, whereby the amplifying means receiving said out of range signal is caused to produce a difference signal representing the amplified difference between the magnitude of said out of range signal and a predetermined correction level.

9. A circuit for performing an analog to digital conversion, comprising:

means for supplying an analog signal;

a plurality of difference amplifying means, each having a first and a second input and an output, said means being serially interconnected with the output of each connected to the first input of the next, the first said means in said series having its input connected to said analog signal supply means;

signal level detection means sequentially receiving signals from said analog signal supply means and from the outputs of said amplifying means and producing an output indicative of a digit of said conversion in response to each said input signal;

storage means;

gating means for transferring representations of said digits to said storage means;

output means for transferring the digit representations stored in said storage means for external utilization;

feedback means sequentially operative to cause the signal levels represented by said digit representation stored in said storage means to be presented to the second inputs of said amplifying means, thereby causing each respective amplifying means to produce a difference signal representing the amplified difference between the magnitude of the signal applied to the first input of said respective amplifying means and the level represented by one of said stored digit representations;

means operative when the magnitude of the signal applied to the first input of an amplifying means lies outside the range of said signal level detection means for generating a correction digit and for presenting a representation of said correction digit to said gating means for transfer to said storage means along with said representation of said conversion digit produced in response to said out of range signal, whereby the amplifying means receiving said out of range signal is caused to produce a difference signal representing the amplified difference between the magnitude of said out of range signal and a predetermined correction level; and means operative in response to storage of said representations of said conversion and correction digits to condition said output means to transfer different digit representations in place of those indicated by the signal level detection means outputs generated in response to said out of range input signal and the input signal received by the amplifying means preceding in said series the amplifying means receiving said out of range signal.

10. A circuit for performing an analog to digital conversion, comprising:

means for supplying an analog signal;

a plurality of difference means, each having a first and a second input and an output, said means being serially interconnected with the output of each connected to the first input of the next, the first said means in said series having its first input connected to said analog signal supply means;

signal level detection means sequentially receiving signals from said analog signal supply means and from the outputs of said difference means and sequentially producing output signals indicative of the digits of said conversion;

feedback means sequentially operative to cause the signal levels represented by said output signals to be presented to the second inputs of said difference means; and correction means operative when the magnitude of the signal applied to the first input of a difference means lies outside the range of said signal level detection means to inhibit the difference means receiving said out of range signal from producing a difference signal.

11. A circuit for performing an analog to digital conversion, comprising:

means for supplying an analog signal;

a plurality of difference means, each having a first and a second input and an output, said means being serially interconnected with the output of each connected to the first input of the next, the first said means in said series having its first input connected to said analog signal supply means;

signal level detection means sequentially receiving signals from said analog signal supply means and from the outputs of said difference means and sequentially producing output signals indicative of the digits of said conversion;

feedback means sequentially operative to cause the signal levels represented by said output signals to be presented to the second inputs of said difference means; and correction means operative when the magnitude of the signal applied to the first input of a difference means lies outside the range of said signal level detection means to cause the difference means receiving said out of range signal to produce a signal representative of the difference between the magnitude of said out of range signal and a predetermined correction level.

12. A circuit for performing an analog to digital conversion, comprising:

means for supplying an analog signal;

a plurality of difference means, each having a first and a second input and an output, said means being serially interconnected with the output of each connected to the first input of the next, the first said means in said series having its first input connected to said analog signal supply means;

signal level detection means sequentially receiving signals from said analog signal supply means and from the outputs of said difference means and sequentially producing output signals indicative of the digits of said conversion;

feedback means sequentially operative to cause the signal levels represented by said output signals to be presented to the second inputs of said difference means;

first correction means operative when the magnitude of the signal applied to the first input of a difference means lies below the range of said signal level detection means to cause the difference means receiving said out of range signal to produce a signal representative of the difference between the magnitude of said out of range signal and a first predetermined correction level; and second correction means operative when the magnitude of the signal applied to the first input of a difference means lies above the range of said signal level detection means to cause the difference means receiving said out of range signal to produce a signal representative of the difference between the magnitude of said out of range signal and a second predetermined correction level.

13. A circuit for performing an analog to digital conversion, comprising:

means for supplying an analog signal;

a plurality of difference means serially interconnected with the output of each connected to the input of the next, the first said means in said series having its input connected to said analog signal supply means;

signal level detection means sequentially receiving signals from said analog signal supply means and from the outputs of said difference means and producing an output signal indicative of a digit of said conversion in response to each said input signal;

output means for transferring representations of said digits for external utilization; and correction means operative when the magnitude of the signal applied to the input of a difference means lies outside the range of said signal level detection means to cause said output means to transfer different digit representations in place of those indicated by the output signals generated in response to said out of range input signal and the input signal received by the difference means preceding in said series the difference means receiving said out of range signal.

14. A circuit for performing an analog to digital conversion, comprising:

means for supplying an analog signal;

a plurality of difference means serially interconnected with the output of each connected to the input of the next, the first said means in said series having its input connected to said analog signal supply means;

signal level detection means sequentially receiving signals from said analog signal supply means and from the outputs of said difference means and producing an output signal indicative of a digit of said conversion in response to each said input signal;

output means for transferring representations of said digits for external utilization; and correction means operative when the magnitude of the signal applied to the input of a difference means lies outside the range of said signal level detection means to cause said output means to transfer different digit representations in place of those indicated by the output signals generated in response to said out of range input signal and the input signal received by the difference means preceding in said series the difference means receiving said out of range signal, the digits represented by said different digit representations being different in value by 1 from those which they replace.

15. A circuit for performing an analog to digital conversion, comprising:

means for supplying an analog signal;

a plurality of difference means serially interconnected with the output of each connected to the input of the next, the first said means in said series having its input connected to said analog signal supply means;

signal level detection means sequentially receiving signals from said analog signal supply means and from the outputs of said difference means and producing an output signal indicative of a digit of said conversion in response to each said input signal;

output means for transferring representations of said digits for external utilization;

first correction means operative when the magnitude of the signal applied to the input of a difference means lies above the range of said signal level detection means to cause said output means to transfer two different digit representations in place of the two indicated by the output signals generated in response to said out of range input signal and the input signal received by the difference means preceding in said series the difference means receiving said out of range signal, said two different representations representing the two lowest order digits of a number greater by 1 than the number indicated by said replaced output signals; and second correction means operative when the magnitude of the signal applied to the input of a difference means lies below the range of said signal level detection means to cause said output means to transfer two different digit representations in place of those two indicated by the output signals generated in response to said out of range input signal and the input signal received by the difference means preceding in said series the amplifying means receiving said out of range signal, said last mentioned two different digit representations representing the two lowest order digits of a number less by 1 than the number indicated by said last mentioned replaced output signals.

16. A circuit for performing an analog to digital conversion, comprising:

means for supplying an analog signal;

a plurality of difference means, each having a first and a second input and an output, said means being serially interconnected with the output of each connected to the first input of the next, the first said means in said series having its input connected to said analog signal supply means;

signal level detection means sequentially receiving signals from said analog signal supply means and from the outputs of said difference means and sequentially producing outputs indicative of the digits of said conversion;

storage means;

gating means for transferring representations of said digits to said storage means;

feedback means sequentially operative to cause the signal levels represented by said digit representations stored in said storage means to be presented to the second inputs of said difference means, thereby causing each respective difference means to produce a signal representing the difference between the magnitude of the signal applied to the first input of said respective difference means and the level represented by one of said stored digit representations; and correction means operative when the magnitude of the signal applied to the first input of a difference means lies outside the range of said signal level detection means for generating an output representative of a correction digit and for presenting a representation of said correction digit to said gating means for transfer of said storage means along with said representation of said conversion digit, whereby the difference means receiving said out of range signal is caused to produce a signal representing the difference between the magnitude of said out of range signal and a predetermined correction level.

17. A circuit for performing an analog to digital conversion, comprising:

means for supplying an analog signal;

a plurality of difference means, each having a first and a second input and an output, said means being serially interconnected with the output of each connected to the first input of the next, the first said means in said series having its input connected to said analog signal supply means;

signal level detection means sequentially receiving signals from said analog signal supply means and from the outputs of said difference means and producing an output indicative of a digit of said conversion in response to each said input signal;

storage means;

gating means for transferring representations of said digits to said storage means;

output means for transferring the digit representations stored in said storage means for external utilization;

feedback means sequentially operative to cause the signal levels represented by said digit representations stored in said storage means to be presented to the second inputs of said difference means, thereby causing each respective difference means to produce a signal representing the difference between the magnitude of the signal applied to the first input of said respective amplifying means and the level represented by one of said stored digit representations;

means operative when the magnitude of the signal applied to the first input of a difference means lies outside the range of said signal level detection means for generating a correction digit and for presenting a representation of said correction digit to said gating means for transfer to said storage means along with said representation of said conversion digit produced in response to said out of range signal, whereby the difference means receiving said out of range signal is caused to produce a signal representing the difference between the magnitude of said out of range signal and a predetermined correction level; and means operative in response to storage of said representations of said conversion and correction digits to condition said output means to transfer different digit representations in place of those indicated by the signal level detection means outputs generated in response to said out of range input signal and the input signal received by the difference means preceding in said series the difference means receiving said out of range signal.

18. A circuit for performing an analog to digital conversion, comprising:

means for supplying an analog signal;

signal level detection means receiving said analog signal and producing a first output indicative of a digit of said conversion;

storage means;

gating means for transferring a representation of said digit to said storage means;

output means for transferring the digit representation stored in said storage means for external utilization;

difference means for producing a signal indicative of the difference between the level represented by the representation stored in said storage means and the magnitude of said analog signal;

means operative when the magnitude of said analog signal lies outside the range of said signal level detection means for generating a second output representative of a correction digit and for presenting a representation of said correction digit to said gating means for transfer to said storage means along with said representation of said conversion digit, whereby a representation of a predetermined correction level is stored in said storage means;

means operative in response to storage of said representations of said digit and said correction digit to condition said output means to transfer a representation of a digit different in value from that indicated by said first output; and timing means for actuating said gating means.

19. A circuit for performing an analog to digital conversion, comprising:

means for supplying an analog signal;

signal level detection means receiving said analog signal and producing a first output indicative of a digit of said conversion;

storage means;

gating means for transferring a representation of said digit to said storage means;

output means for transferring the digit representation stored in said storage means for external utilization;

difference means for producing a signal indicative of the difference between the level represented by the representation stored in said storage means and the magnitude of said analog signal;

means operative when the magnitude of said analog signal lies outside the range of said signal level detection means for generating a second output representative of a correction digit and for presenting a representation of said correction digit to said gating means for transfer to said storage means along with said representation of said conversion digit, whereby a representation of a predetermined correction level is stored in said storage means; and means operative in response to storage of said representations of said digit and said correction digit to condition said output means to transfer a representation of a digit different in value from that indicated by said first output.

20. A circuit for performing an analog to digital conversion, comprising:

means for supplying a first analog signal;

signal level detection means receiving said analog signal and producing a first output indicative of a digit of said conversion;

storage means;

gating means for transferring a representation of said digit to said storage means;

output means for transferring the digit representation stored in said storage means for external utilization;

difference means for producing a signal indicative of the difference between the level represented by the representation stored in said storage means and the magnitude of a second analog signal derived from said first analog signal;

means operative when the magnitude of said second analog signal lies outside the range of said signal level detection means for generating a second output representative of a correction digit and for presenting a representation of said correction digit to said gating means for transfer to said storage means along with said representation of said conversion digit, whereby a representation of a predetermined correction level is stored in said storage means; and means operative in response to storage of said representations of said digit and said correction digit to condition said output means to transfer a representation of a digit different in value from that indicated by said first output.

21. A circuit for performing an analog to digital conversion, comprising:

means for supplying an analog signal;

signal level detection means receiving said analog signal and producing a first output indicative of a digit of said conversion;

storage means;

gating means for transferring a representation of said digit to said storage means;

output means for transferring the digit representation stored in said storage means for external utilization;

amplifying means for producing a signal indicative of the amplified difference between the level represented by the representation stored in said storage means and the magnitude of said analog signal;

means operative when the magnitude of said analog signal lies outside the range of said signal level detection means for generating a second output representative of a correction digit and for presenting a representation of said correction digit to said gating means for transfer to said storage means along with said representation of said conversion digit, whereby a representation of a predetermined correction level is stored in said storage means; and means operative in response to storage of said representations of said digit and said correction digit to condition said output means to transfer a representation of a digit different in value from that indicated by said first output.

22. A circuit for performing an analog to digital conversion, comprising:

means for supplying an analog signal;

signal level detection means receiving said analog signal and producing a first output indicative of a digit of said conversion;

storage means;

gating means for transferring a representation of said digit to said storage means;

output means for transferring the digit representation stored in said storage means for external utilization;

difference means for producing a difference signal indicative of the difference between the level represented by the representation stored in said storage means and the magnitude of said analog signal;

means operative when the magnitude of said analog signal lies outside the range of said signal level detection means for generating a second output representative of a correction digit and for presenting a representation of said correction digit to said gating means for transfer to said storage means along with said representation of said conversion digit, whereby a representation of a predetermined correction level is stored in said storage means;

means operative in response to storage of said representations of said digit and said correction digit to condition said output means to transfer a representation of a digit different in value from that indicated by said first output; and means operative in response to storage of said correction digit to inhibit said difference means from producing said difference signal.

23. A circuit for performing an analog to digital conversion, comprising:

means for supplying an analog signal;

signal level detection means receiving said analog signal and producing a first output indicative of a digit of said conversion;

storage means;

gating means for transferring a representation of said digit to said storage means;

output means for transferring the digit representation stored in said storage means for external utilization;

difference means for producing a signal indicative of the difference between the level represented by the representation stored in said storage means and the magnitude of said analog signal;

first correction means operative when the magnitude of said analog signal lies below the range of said signal level detection means for generating a second output representative of a first correction digit and for presenting a representation of said first correction digit to said gating means for transfer to said storage means along with said representation of said conversion digit, whereby a representation of a predetermined first correction level is stored in said storage means;

means operative in response to storage of said representations of said digit and said first correction digit to condition said output means to transfer a representation of a first digit different in value from that indicated by said first output;

second correction means operative when the magnitude of said analog signal lies above the range of said signal level detection means for generating a third output representative of a second correction digit and for presenting a representation of said second correction digit to said gating means for transfer to said storage means along with said representation of said conversion digit, whereby a representation of a predetermined second correction level is stored in said storage means; and means operative in response to storage of said representations of said digit and said second correction digit to condition said output means to transfer a representation of a second digit different in value from that indicated by said first output.

References Cited

UNITED STATES PATENTS

| | | | |
|---|---|---|---|
| 3,119,105 | 1/1964 | Jepperson | 340—347 |
| 3,221,324 | 11/1965 | Margopoulos | 340—347 |

MAYNARD R. WILBUR, Primary Examiner

CHARLES D. MILLER, Assistant Examiner

U.S. Cl. X.R.

235—154